US 10,093,166 B2

(12) United States Patent
Toyota et al.

(10) Patent No.: US 10,093,166 B2
(45) Date of Patent: Oct. 9, 2018

(54) POWER GENERATION CONTROL SYSTEM FOR HYBRID VEHICLE

(71) Applicant: Nissan Motor Co., Ltd., Yokohama-shi, Kanagawa (JP)

(72) Inventors: Ryohey Toyota, Kanagawa (JP);
Kenichiro Gunji, Kanagawa (JP);
Tomohiro Miyagawa, Kanagawa (JP);
Masato Koga, Kanagawa (JP);
Hiroyuki Fukuda, Kanagawa (JP);
Hidekazu Yagi, Kanagawa (JP);
Shinobu Kamada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/578,272

(22) PCT Filed: Jun. 8, 2015

(86) PCT No.: PCT/JP2015/066492
§ 371 (c)(1),
(2) Date: Nov. 30, 2017

(87) PCT Pub. No.: WO2016/199194
PCT Pub. Date: Dec. 15, 2016

(65) Prior Publication Data

US 2018/0141428 A1  May 24, 2018

(51) Int. Cl.
*B60W 20/40* (2016.01)
*B60K 6/485* (2007.10)
(Continued)

(52) U.S. Cl.
CPC .............. *B60K 6/485* (2013.01); *B60K 6/387* (2013.01); *B60K 6/442* (2013.01); *B60K 6/547* (2013.01);
(Continued)

(58) Field of Classification Search
CPC .......... B60K 6/46; B60K 6/442; B60K 6/485; B60W 10/08; B60W 20/40
See application file for complete search history.

(56) References Cited

U.S. PATENT DOCUMENTS 5,550,445 A * 8/1996 Nii ........................... B60K 6/46
180/65.245
6,492,741 B1 * 12/2002 Morimoto .............. B60K 6/485
180/65.1
(Continued)

FOREIGN PATENT DOCUMENTS

CN          102358283 A      2/2012
CN          102658771 A      9/2012
(Continued)

*Primary Examiner* — Katy M Ebner
(74) *Attorney, Agent, or Firm* — Global IP Counselors, LLP

(57) ABSTRACT

A hybrid vehicle has a first motor/generator mechanically coupled to a drive wheel, a second motor/generator mechanically coupled to an internal combustion engine and a high-power battery that is electrically coupled to the motor/generators. The second motor/generator has a smaller electrical power generation capability than the first motor/generator. While starting the vehicle at a time of insufficient battery capacity required for the EV start, the power generation controller disconnects the first electric motor from the drive wheel, connects the first electric motor to the internal combustion engine, and carries out MG1 idle power generation in which the first electric motor generates power by receiving torque from the internal combustion engine. When the vehicle is stopped at a time of sufficient battery capacity, the power generation controller does not carry out the MG1 idle power generation and keeps the first electric motor mechanically coupled to the drive wheel.

19 Claims, 16 Drawing Sheets

(51) Int. Cl.
*B60K 6/547* (2007.10)
*B60W 10/06* (2006.01)
*B60W 10/08* (2006.01)
*B60W 10/10* (2012.01)
*B60W 20/20* (2016.01)
*B60K 6/387* (2007.10)
*B60K 6/442* (2007.10)
*B60W 10/11* (2012.01)
*B60W 30/18* (2012.01)
*B60W 20/13* (2016.01)
*B60W 20/00* (2016.01)
*B60K 6/48* (2007.10)

(52) U.S. Cl.
CPC ............ *B60W 10/06* (2013.01); *B60W 10/08* (2013.01); *B60W 10/10* (2013.01); *B60W 10/11* (2013.01); *B60W 20/13* (2016.01); *B60W 20/20* (2013.01); *B60W 30/18054* (2013.01); *B60W 30/18063* (2013.01); *B60K 2006/4808* (2013.01); *B60W 20/00* (2013.01); *B60W 2510/186* (2013.01); *B60W 2510/244* (2013.01); *B60W 2520/04* (2013.01); *B60W 2520/10* (2013.01); *B60W 2540/12* (2013.01); *B60W 2550/142* (2013.01); *Y02T 10/6221* (2013.01); *Y02T 10/6286* (2013.01)

(56) References Cited

U.S. PATENT DOCUMENTS

| | | | | |
|---|---|---|---|---|
| 6,504,259 | B1* | 1/2003 | Kuroda | B60K 6/46 180/65.25 |
| 6,532,926 | B1* | 3/2003 | Kuroda | B60H 1/00778 123/179.4 |
| 6,938,713 | B1* | 9/2005 | Tahara | B60K 6/485 180/65.26 |
| 9,428,173 | B2* | 8/2016 | Stefanon | B60W 10/06 |
| 9,670,868 | B2* | 6/2017 | Hirano | F02D 17/04 |
| 2005/0001606 | A1* | 1/2005 | Kagoshima | B60K 6/46 323/371 |
| 2013/0154576 | A1 | 6/2013 | Shin et al. | |
| 2014/0012450 | A1* | 1/2014 | Laing | B60L 11/14 701/22 |
| 2015/0046010 | A1* | 2/2015 | Wakashiro | B60K 6/46 701/22 |
| 2018/0029586 | A1* | 2/2018 | Dextreit | B60W 10/08 |

FOREIGN PATENT DOCUMENTS

| | | |
|---|---|---|
| CN | 102815294 A | 12/2012 |
| CN | 103072461 A | 5/2013 |
| CN | 103958246 A | 7/2014 |
| DE | 10 2011 005 451 A1 | 9/2012 |
| DE | 10 2011 089 710 A1 | 6/2013 |
| JP | 55-157901 A | 12/1980 |
| JP | 2000-220734 A | 8/2000 |
| JP | 2000-224710 A | 8/2000 |
| JP | 2003-79005 A | 3/2003 |
| JP | 3496654 B2 | 2/2004 |
| JP | 2015-13503 A | 1/2015 |
| RU | 2457959 C2 | 8/2012 |

* cited by examiner

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| Left | Left | Lock | EV 1st ICE 2nd | Lock |
| Left | N | EV 1.5 ICE 2nd | EV – ICE 2nd | Lock |
| N | Right | Lock | EV 2nd ICE 2nd | Lock |
| N | Right | EV 2nd ICE 3rd' | EV 2nd ICE – | EV 2nd ICE 3rd |
| Right | Right | Lock | EV 2nd ICE 4th | Lock |
| Right | N | EV 2.5 ICE 4th | EV – ICE 4th | Lock |
| Right | Left | Lock | EV 1st ICE 4th | Lock |

 : NORMAL USE GEAR SHIFT STAGE

 : GEAR SHIFT STAGE USED AT LOW SOC, ETC.

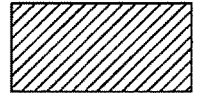 : GEAR SHIFT STAGE THAT CANNOT BE SELECTED BY SHIFT MECHANISM

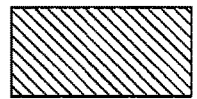 : GEAR SHIFT STAGE NOT NORMALLY USED

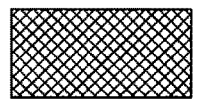 : GEAR SHIFT STAGE THAT CANNOT BE SELECTED BY INTERLOCK

FIG. 4

POWER GENERATION CONTROL SYSTEM FOR HYBRID VEHICLE

CROSS-REFERENCE TO RELATED APPLICATIONS

This application is a U.S. National stage application of International Application No. PCT/JP2015/066492, filed Jun. 8, 2015.

BACKGROUND

Field of the Invention

The present invention relates to a power generation control device for a hybrid vehicle that carries out EV start using a first electric motor, to which electrical power generated in the second electric motor and battery power are supplied, as a drive source, when starting a vehicle.

Background Information

Conventionally, a series hybrid vehicle that starts an engine according to a charging state of a battery, and that charges the battery by a generator, is known (for example, refer to Japanese Laid Open Patent Application No. Sho 55-157901—Patent Document 1).

SUMMARY

However, the conventional series hybrid vehicle is configured such that only the torque of a starting motor is used when starting, and required electrical power to the starting motor is supplied by battery power and series generated power. Accordingly, there is the problem that when the required electrical power cannot be provided by the battery power and the series generated power, such as when the battery SOC is low, the vehicle cannot be started.

In view of the problem described above, an object of the present invention is to provide a power generation control device for a hybrid vehicle that is able to secure the electrical power required for starting, while the vehicle is stopped.

In order to achieve the object described above, the hybrid vehicle of the present invention comprises a first electric motor that is mechanically coupled to drive wheel, and that is mainly used as a drive source for travel, a second electric motor that is mechanically coupled to an internal combustion engine, and that has a smaller electrical power generation capability than the first electric motor, and a battery that is electrically coupled to the first electric motor and the second electric motor. When starting a vehicle, an EV start is carried out using the first electric motor as a drive source to which electrical power generated in the second electric motor and battery power are supplied, in a starting region, in which the vehicle speed is equal to or less than a predetermined vehicle speed, by not having a starting element that absorbs differential rotation. This hybrid vehicle is provided with a power generation controller, which causes at least one of the first electric motor and the second electric motor to generate power using the torque of the internal combustion engine. While the vehicle is stopped, the power generation controller disconnects the first electric motor from the drive wheel and connects the power generation controller to the internal combustion engine, and carries out MG1 idle power generation, in which power is generated by the first electric motor by receiving the torque from the internal combustion engine, at a time of insufficient battery capacity, in which the charge capacity of the battery is less than a first capacity threshold value corresponding to the electrical power that is necessary for the EV start, and does not carry out the MG1 idle power generation and keeps the first electric motor mechanically coupled to the drive wheel, at a time of sufficient battery capacity in which the charge capacity of the battery is equal to or greater than the first capacity threshold value.

Therefore, the power generation controller disconnects the first electric motor, which has a greater electrical power generation capability than the second electric motor, from the drive wheel and connects the same to the internal combustion engine when the vehicle is stopped, and carries out MG1 idle power generation, in which power is generated by the first electric motor by receiving the torque from the internal combustion engine. That is, since MG1 idle power generation, in which power is generated by the first electric motor, is carried out while the vehicle is stopped, more generated electrical power can be obtained compared to MG2 idle power generation, in which power is generated by the second electric motor, when the stopping time is the same, thereby preventing a reduction in the battery capacity. As a result, it is possible to secure the electrical power required for starting, while the vehicle is stopped.

BRIEF DESCRIPTION OF THE DRAWINGS

Referring now to the drawings, a power generation control device is illustrated for a hybrid vehicle.

FIG. 4 is an engagement table illustrating the gear shift stages according to the switching positions of three engagement clutches in a multistage gear transmission mounted on a hybrid vehicle to which is applied the power generation control device of the first embodiment.

DETAILED DESCRIPTION OF THE EMBODIMENTS

Figure 1:
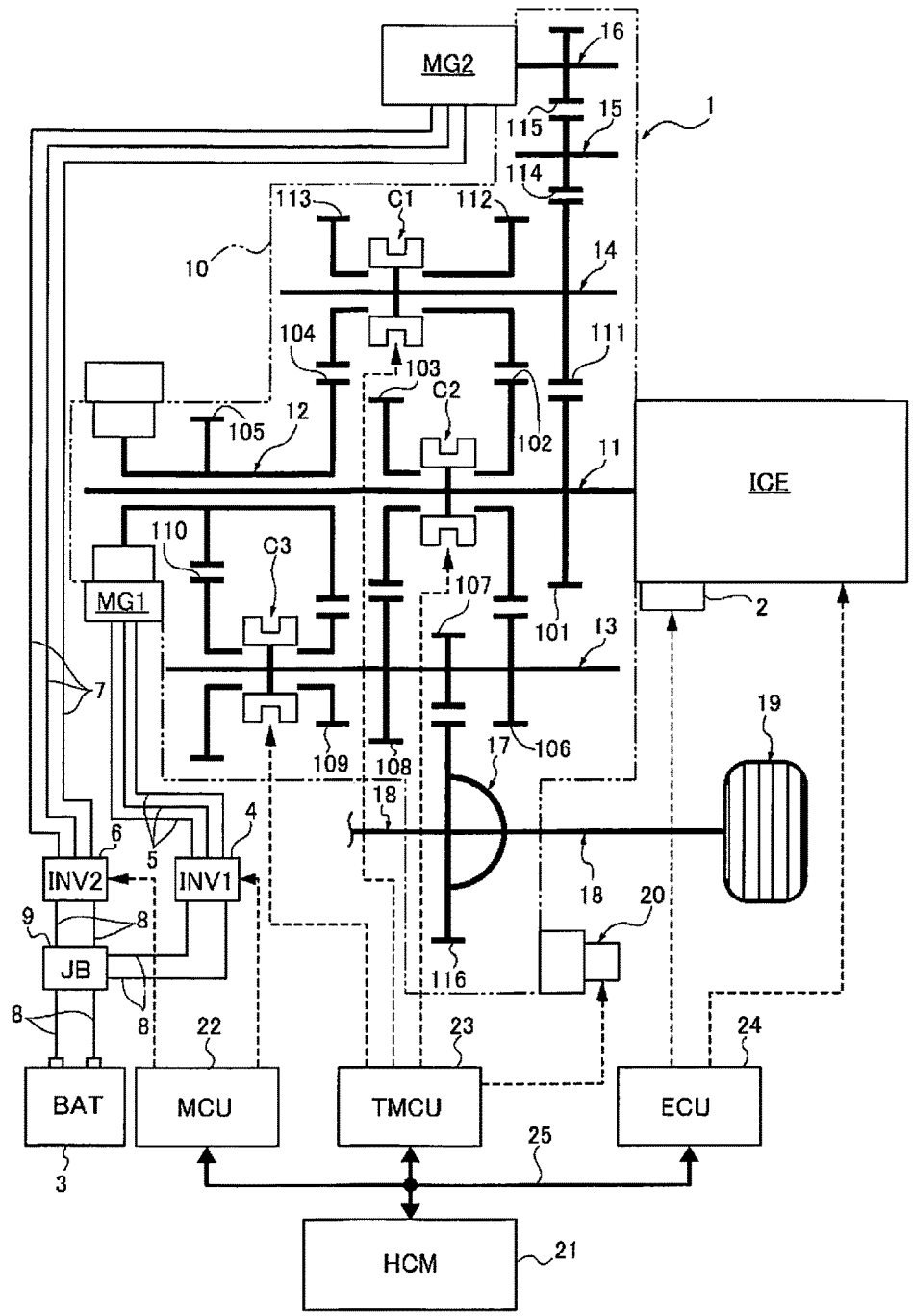
FIG. 1 is an overall system view illustrating a drive system and a control system of a hybrid vehicle to which is applied the power generation control device of a first embodiment.

A preferred embodiment for realizing the power generation control device for a hybrid vehicle of the present invention is described below, based on the first embodiment illustrated in the drawings.

First Embodiment

The configuration is described first. The power generation control device of the first embodiment is applied to a hybrid vehicle (one example of a hybrid vehicle), comprising, as drive system components, one engine, two motor/generators, and a multistage gear transmission having three engagement clutches. The "overall system configuration," the "configuration of the shift control system," the "configuration of the gear shift stages," and the "configuration of the power generation control process" will be separately described below, regarding the configuration of the power generation control device for a hybrid vehicle in the first embodiment.

Overall System Configuration

FIG. 1 illustrates a drive system and a control system of a hybrid vehicle to which is applied the power generation control device of the first embodiment. The overall system configuration will be described below, based on FIG. 1.

The drive system of the hybrid vehicle comprises an internal combustion engine ICE, a first motor/generator MG1, a second motor/generator MG2, and a multistage gear transmission 1 having three engagement clutches C1, C2, C3, as illustrated in FIG. 1. "ICE" is an acronym for "Internal Combustion Engine."

The internal combustion engine ICE is, for example, a gasoline engine or a diesel engine that is disposed in a front compartment of a vehicle such that the crankshaft direction is in the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 is left in preparation for when an MG2 start using a high-power battery 3 cannot be ensured, such as during extreme cold.

Both the first motor/generator MG1 and the second motor/generator MG2 are permanent magnet types of synchronous motors utilizing three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1. A first inverter 4, which converts direct current into three-phase alternating current during powering and converts three-phase alternating current into direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed on the first shaft 11, in order from the right side in FIG. 1. The first gear 101 is integrally provided (including integral fixing) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is connected to the first motor/generator MG1, and is a cylindrical shaft that is coaxially disposed with the axis aligned with the outer side position of the first shaft 11, and a fourth gear 104 and a fifth gear 105 are disposed on the second shaft 12, in order from the right side in FIG. 1. The fourth gear 104 and the fifth gear 105 are integrally provided (including integral fixing) on the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed on the third shaft 13, in order from the right side in FIG. 1. The sixth gear 106, the seventh gear 107, and the eighth gear 108 are integrally provided (including integral fixing) on the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 is a shaft in which both ends are supported to the transmission case 10, and an eleventh gear 111, a twelfth gear 112, and a thirteenth gear 113 are disposed on the fourth shaft 14, in order from the right side in FIG. 1. The eleventh gear 111 is integrally provided (including integral fixing) to the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 has both ends supported on the transmission case 10, and a fourteenth gear 114 that meshes with the eleventh gear 111 of the fourth shaft 14 is integrally provided thereto (including integral fixing).

The sixth shaft 16 is connected to the second motor/generator MG2, and a fifteenth gear 115 that meshes with the fourteenth gear 114 of the fifth shaft 15 is integrally provided thereto (including integral fixing).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement stroke in a rotationally synchronized state without possessing a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch interposed between the second gear 102 and the third gear 103 of the first shaft 11, and is engaged by an engagement stroke in a rotationally synchronized state without possessing a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch interposed between the ninth gear 109 and the tenth gear 110 of the third shaft 13, and is engaged by an engagement stroke in a rotationally synchronized state without possessing a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means having the function of appropriately managing the energy consumption of the entire vehicle. The hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target torque is determined. In the "rotational speed FB control," a control is carried out in which a target motor rotation speed, with which the input-output rotational speeds of the clutch are synchronized, is determined, and an FB torque is output so as to converge the actual motor rotation speed to the target motor rotation speed, when there is a gear shift request to meshingly engage any one of the engagement clutches C1, C2, C3 during traveling.

The transmission control unit 23 (acronym: "TMCU") carries out a shift control for switching the gear shift stage of the multistage gear transmission 1, by outputting a current command to electric actuators 31, 32, 33 (refer to FIG. 2), based on predetermined input information. In this shift control, the engagement clutches C1, C2, C3 are selectively mesh engaged/released, and a gear pair involved in power transmission is selected from the plurality of pairs of gear pairs. Here, at the time of a gear shift request to engage any one of the released engagement clutches C1, C2, C3, in order to suppress differential rotation speed between the input-output of the clutch to ensure meshing and engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to the first embodiment is characterized in that efficiency is achieved by reducing drag by employing, as shifting elements, engagement clutches C1, C2, C3 (dog clutch) that are meshingly engaged. Then, when there is a gear shift request to meshingly engage any one of the engagement clutches C1, C2, C3, the differential rotation speeds of the input-output of the clutch are synchronized by the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes equal to or less than a release torque determination value, to realize the gear shift. The configuration of the shift control system of the multistage gear transmission 1 is described below based on FIG. 2.

Figure 2:
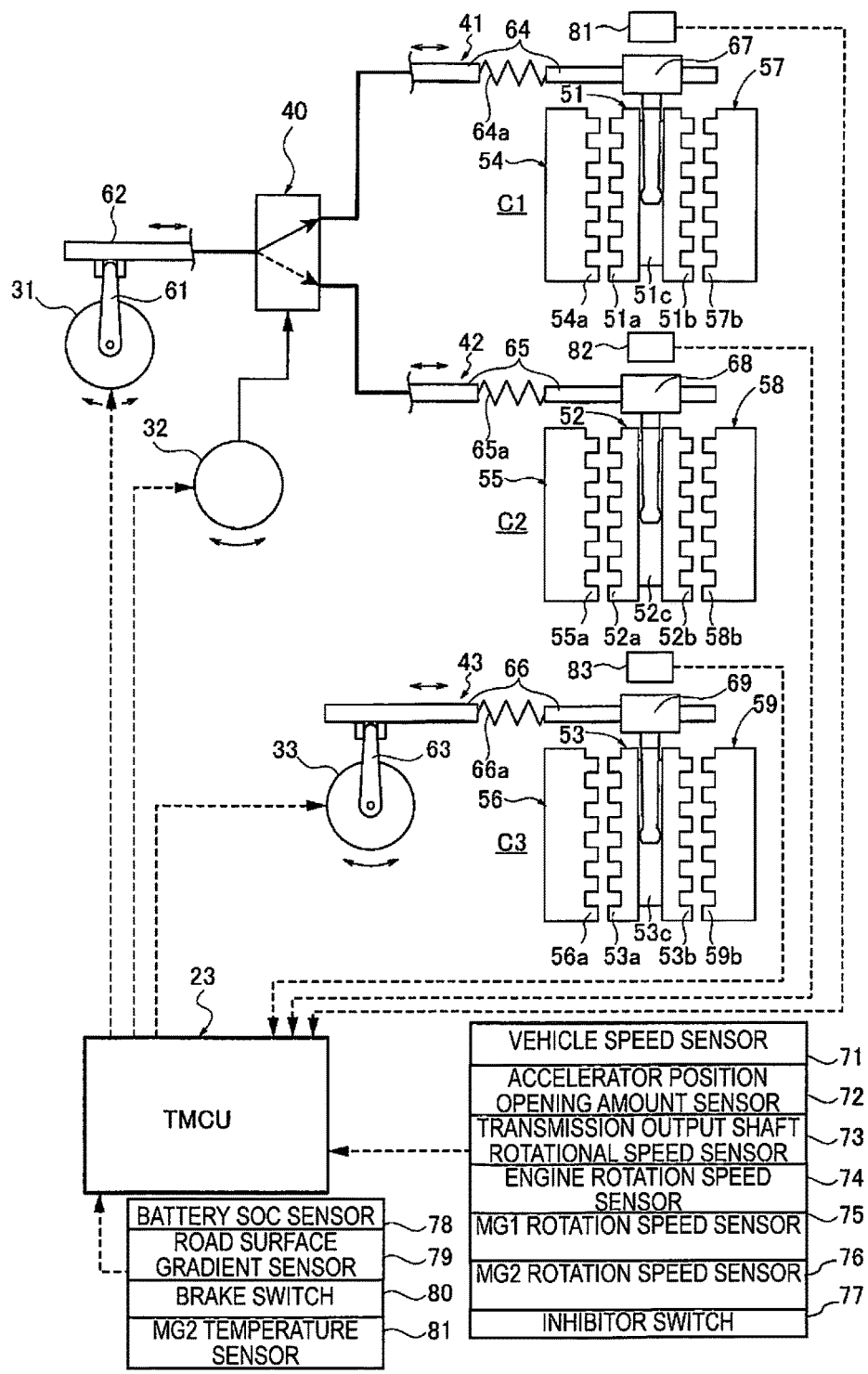
FIG. 2 is a control system block diagram illustrating the configuration of a shift control system of a multistage gear transmission mounted on a hybrid vehicle to which is applied the power generation control device of the first embodiment.

The shift control system comprises, as engagement clutches, a first engagement clutch C1, a second engagement clutch C2, and a third engagement clutch C3, as illustrated in FIG. 2. A first electric actuator 31 for C1, C2 shift operation, a second electric actuator 32 for C1, C2 select operation, and a third electric actuator 33 for C3 shift operations are provided as actuators. A C1/C2 select operation mechanism 40, a C1 shift operation mechanism 41, a C2 shift operation mechanism 42, and a C3 shift operation mechanism 43 are provided as shift mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b; 52a, 52b; and 53a, 53b on both sides having flat top faces. Furthermore, fork grooves 51c, 52c, and 53c are provided in the circumferential center portions of the coupling sleeves 51, 52, 53. The left dog clutch rings 54, 55, and 56 are fixed to the boss portions of the gears 113, 103, and 110, which are left idling gears of the engagement clutches C1, C2, and C3, and have dog teeth 54a, 55a, and 56a with flat top faces that oppose the dog teeth 51a, 52a, and 53a. The right dog clutch rings 57, 58, and 59 are fixed to the boss portions of the gears 112, 102, and 109, which are right idling gears of the engagement clutches C1, C2, and C3, and have dog teeth 57b, 58b, and 59b with flat top faces that oppose the dog teeth 51b, 52b, and 53b.

The C1/C2 select operation mechanism 40 is a mechanism for selecting between a first position for selecting a connection between the first electric actuator 31 and the C1 shift operation mechanism 41, and a second position for selecting a connection between the first electric actuator 31 and the C2 shift operation mechanism 42. When selecting the first position, a shift rod 62 and a shift rod 64 of the first engagement clutch C1 are connected, and a shift rod 65 of the second engagement clutch C2 is locked in the neutral position. When selecting the second position, the shift rod 62 and the shift rod 65 of the second engagement clutch C2 are connected, and the shift rod 64 of the first engagement clutch C1 is locked in the neutral position. That is, the mechanism is such that, when selecting a position from among the first position and the second position, where one of the engagement clutches is shifted, the other engagement clutch is locked and fixed in the neutral position.

The C1 shift operation mechanism 41, the C2 shift operation mechanism 42, and the C3 shift operation mechanism 43 convert the turning motions of the electric actuators 31, 33 into axial stroke motions of the coupling sleeves 51, 52, 53. The shift operating mechanisms 41, 42, 43 all have the same configuration, comprising turning links 61, 63, shift rods 62, 64, 65, 66, and shift forks 67, 68, 69. One end of each of the turning links 61, 63 is provided on the actuator shafts of the electric actuators 31, 33, with the other end connected to one of the shift rods 64 (or shift rod 65), 66 so as to be relatively displaceable. The shift rods 64, 65, 66 are configured to be capable of expanding and contracting according to the magnitude and the direction of the rod transmitting force, by having springs 64a, 65a, and 66a interposed in the rod dividing positions. One end of each of the shift forks 67, 68, and 69 is fixed to one of the shift rods 64, 65, or 66, and the other end is disposed in one of the fork grooves 51c, 52c, or 53c of the coupling sleeves 51, 52, and 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, a battery SOC sensor 78, a road surface gradient sensor 79, a brake switch 80, an MG2 temperature sensor 81 of the second motor/generator MG2, and the like. The transmission output shaft rotational speed sensor 73 is provided on the shaft end portion of the third shaft 13 and detects the shaft rotation speed of the third shaft 13. Then, a position servo control unit (for example, a position servo system by PID control) is provided, which controls mesh engagement and disengagement of the engagement clutches C1, C2, and C3, determined by the positions of the coupling sleeves 51, 52, and 53. This position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, and 33 such that the positions of the coupling sleeves 51, 52, and 53 will be in the disengaged position or the engagement position according to an engagement stroke. That is, by setting an engaged state in which the dog teeth welded to the coupling sleeves 51, 52, and 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, and 53 and the dog teeth welded to the idling gears are in non-engagement positions by displacing the coupling sleeves 51, 52, and 53 in the axial direction, the idling gears are disconnected from the fourth shaft 14, the first shaft 11, and the third shaft 13.

Configuration of the Gear Shift Stages

The multistage gear transmission 1 of the first embodiment is characterized in that size reduction is achieved by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift stages of the multistage gear transmission 1 is described below based on FIG. 3 and FIG. 4.

Figure 3:
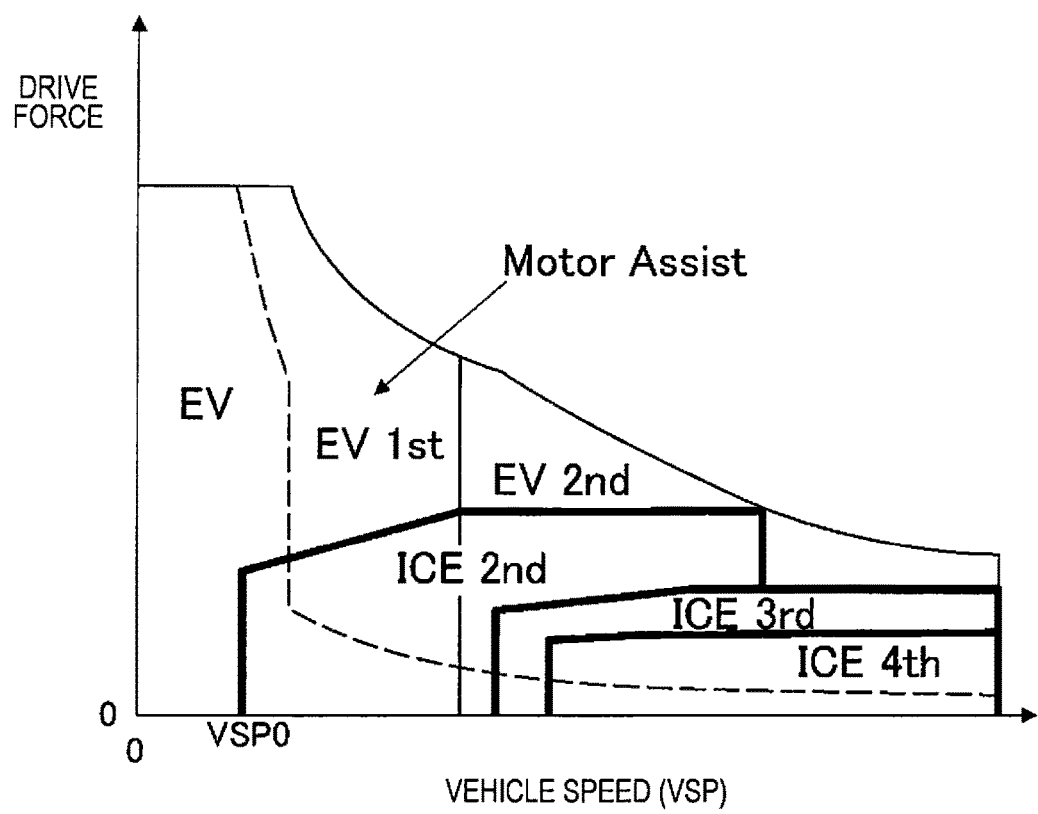
FIG. 3 is a schematic overview of a shifting map illustrating a concept of switching the gear shift stage in a multistage gear transmission mounted on a hybrid vehicle to which is applied the power generation control device of the first embodiment.

A concept of the gear shift stages is employed in which, when the vehicle speed VSP is in a starting region equal to, or less than, a predetermined vehicle speed VSPO, since the multistage gear transmission 1 does not have a starting element (slipping element), a motor start (EV start) by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE 1st)→ICE 2nd→ICE 3rd→ICE 4th, and the EV gear shift stages shift from EV 1st→EV 2nd. Therefore, based on the concept of the gear shift stages illustrated in FIG. 3, a shifting map for issuing gear shift requests for switching the gear shift stage is created.

All of the gear shift stages obtainable by the multistage gear transmission 1 having engagement clutches C1, C2, C3 are as shown in FIG. 4. In FIG. 4, "Lock" represents an interlock gear shift stage that is not applicable as a gear shift stage, "EV-" represents a state in which the first motor/generator MG1 is not drivingly connected to the driving wheels 19, and "ICE-" represents a state in which the internal combustion engine ICE is not drivingly connected to the driving wheels 19. Each of the gear shift stages is described below.

When the second engagement clutch C2 is "N" and the third engagement clutch C3 is "N," the following gear shift stages are obtained according to the position of the first engagement clutch C1. "EV-ICEgen" is obtained if the first engagement clutch C1 is "Left," "Neutral" is obtained if the first engagement clutch C1 is "N," and "EV-ICE 3rd" is obtained if the first engagement clutch C1 is "Right." Here, the gear shift stage "EV-ICEgen" is a gear shift stage selected at the time of MG1 idle power generation, in which power is generated in the first motor/generator MG1 by the internal combustion engine ICE when the vehicle is stopped, or at the time of double idle power generation in which MG2 power generation is carried out in addition to MG1 power generation. The gear shift stage "Neutral" is a gear shift stage selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift stages are obtained according to the position of the first engagement clutch C1. "EV 1st ICE 1st" is obtained if the first engagement clutch C1 is "Left," "EV 1st ICE-" is obtained if the first engagement clutch C1 is "N," and "EV 1st ICE 3rd" is obtained if the first engagement clutch C1 is "Right." Here, the gear shift stage "EV 1st ICE-" is a gear shift stage selected when in the "EV mode" in which the internal combustion engine ICE is stopped and traveling is carried out by the first motor/generator MG1, or in the "series HEV mode" in which a first-speed EV traveling is carried out by the first motor/generator MG1 while power is generated in the second motor/generator MG2 by the internal combustion engine ICE. In addition, the gear shift stage "EV 1st ICE-" is a gear shift stage selected at the time of MG2 idle power generation, in which power is generated in the second motor/generator MG2 by the internal combustion engine ICE when the vehicle is stopped, and the first motor/generator MG1 is kept mechanically coupled to the drive wheels 19.

When the second engagement clutch C2 is "Left" and the third engagement clutch C3 is "Left," "EV 1st ICE 2nd" is obtained if the position of the first engagement clutch C1 is "N." When the second engagement clutch C2 is "Left" and the third engagement clutch C3 is "N," the following gear shift stages are obtained according to the position of the first engagement clutch C1. "EV 1.5 ICE 2nd" is obtained if the first engagement clutch C1 is "Left," and "EV-ICE 2nd" is obtained if the first engagement clutch C1 is "N." When the second engagement clutch C2 is "Left" and the third engagement clutch C3 is "Right," "EV 2nd ICE 2nd" is obtained if the position of the first engagement clutch C1 is "N."

When the second engagement clutch C2 is "N" and the third engagement clutch C3 is "Right," the following gear shift stages are obtained according to the position of the first engagement clutch C1. "EV 2nd ICE 3rd'" is obtained if the first engagement clutch C1 is "Left," "EV 2nd ICE-" is obtained if the first engagement clutch C1 is "N," and "EV 2nd ICE 3rd" is obtained if the first engagement clutch C1 is "Right." Here, the gear shift stage "EV 2nd ICE-" is a gear shift stage selected when in the "EV mode" in which the internal combustion engine ICE is stopped and traveling is carried out by the first motor/generator MG1, or in the "series HEV mode" in which a second-speed EV travel is carried out by the first motor/generator MG1 while power is generated in the second motor/generator MG2 by the internal combustion engine ICE.

When the second engagement clutch C2 is "Right" and the third engagement clutch C3 is "Right," "EV 2nd ICE 4th" is obtained if the position of the first engagement clutch C1 is "N." When the second engagement clutch C2 is "Right" and the third engagement clutch C3 is "N," the following gear shift stages are obtained according to the position of the first engagement clutch C1. "EV 2.5 ICE 4th" is obtained if the first engagement clutch C1 is "Left," and "EV-ICE 4th" is obtained if the first engagement clutch C1 is "N." When the second engagement clutch C2 is "Right" and the third engagement clutch C3 is "Left," "EV 1st ICE 4th" is obtained if the position of the first engagement clutch C1 is "N."

Described next is a method to separate the "normal use gear shift stage" from all the above-described gear shift stages achieved by engagement combinations of the engagement clutches C1, C2, C3. First, gear shift stages excluding the "interlock gear shift stages (cross hatching in FIG. 4)" and "gear shift stages that cannot be selected by the shift mechanism (right up hatching in FIG. 4)" from all the gear shift stages shall be the plurality of gear shift stages that can be achieved by the multistage gear transmission 1. Here, gear shift stages that cannot be selected by the shift mechanism refer to "EV 1.5 ICE 2nd" in which the first engagement clutch C1 is "Left" and the second engagement clutch C2 is "Left," and "EV 2.5 ICE 4th" in which the first engagement clutch C1 is "Left" and the second engagement clutch C2 is "Right." The reason these gear shift stages cannot be selected by the shift mechanism is that one first electric actuator 31 is a shift actuator that is shared for use with two engagement clutches C1, C2, and that one of the engagement clutches is neutral locked by the C1/C2 select operation mechanism 40.

Then, gear shift stages excluding the "gear shift stages not normally used (right down hatching in FIG. 4)" and "gear shift stages used with low SOC, etc. (dashed line frame in FIG. 4)" from the plurality of gear shift stages that can be achieved by the multistage gear transmission 1 shall be the "normal use gear shift stage (thick line frame in FIG. 4)." Here, the "gear shift stages not normally used" are "EV 2nd ICE 3rd'" and "EV 1st ICE 4th," and the "gear shift stages used with low SOC, etc." are "EV-ICE gen" and "EV 1st ICE 1st."

Therefore, "normal use gear shift stages" are configured by adding "Neutral" to EV gear shift stages (EV 1st, ICE-, EV 2nd ICE-), ICE gear shift stages (EV-ICE 2nd, EV-ICE 3rd, EV-ICE 4th), and combination gear shift stages (EV 1st ICE 2nd, EV 1st ICE 3rd, EV 2nd ICE 2nd, EV 2nd ICE 3rd, EV 2nd ICE 4th).

Configuration of the Power Generation Control Process

Figure 5:
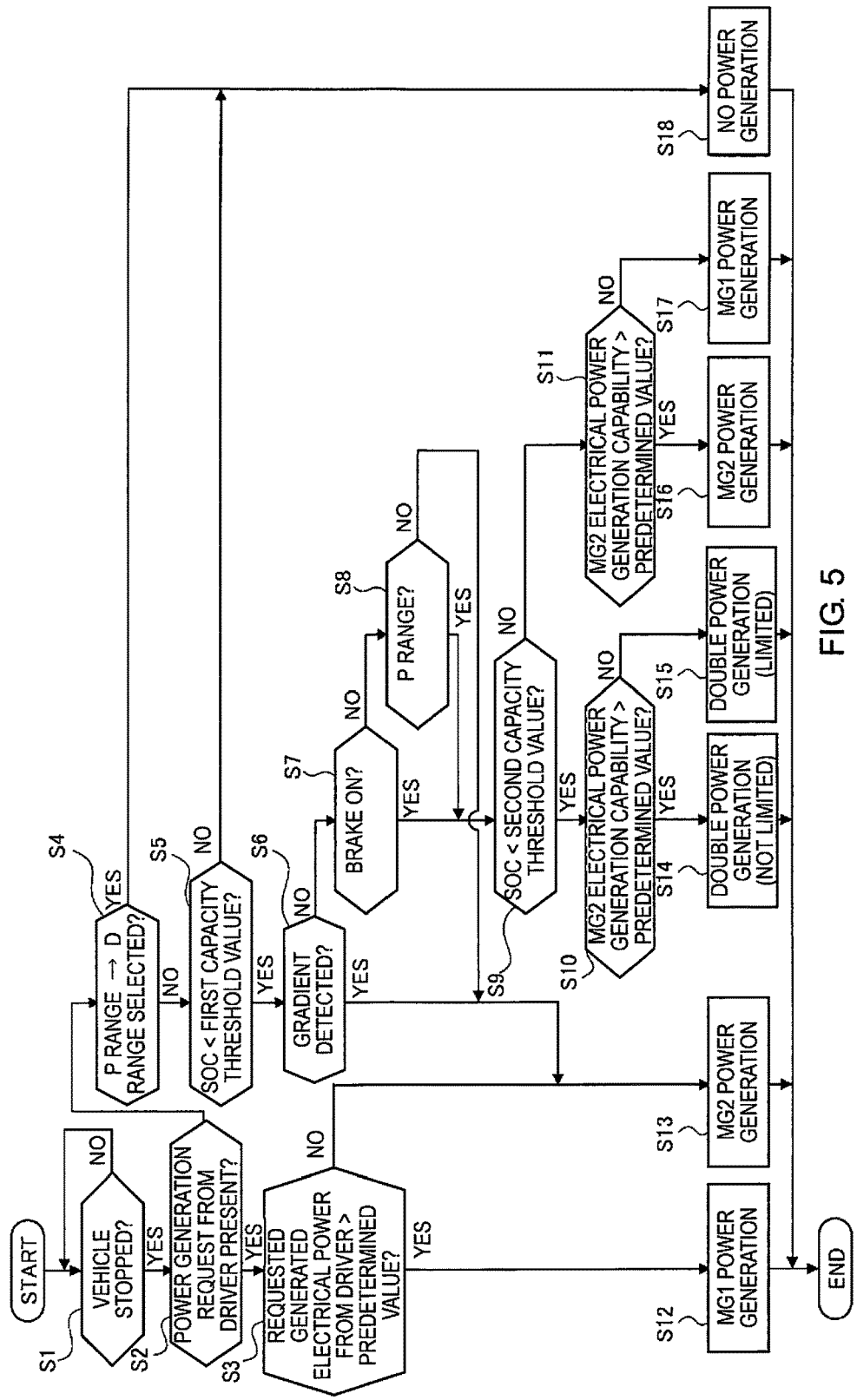
FIG. 5 is a flowchart illustrating a flow of the power generation control process that is executed in the hybrid control module of the first embodiment.

FIG. 5 illustrates the flow of the power generation control process that is executed in the hybrid control module 21 of the first embodiment (power generation controller). Each of the steps in FIG. 5, which represents the power generation control process configuration, will be described below. This process is "START" ed by ignition ON, and is repeatedly executed every predetermined processing time (for example, 10 ms) while the vehicle is activated.

In Step S1, it is determined whether or not the hybrid vehicle is stopped. In the case of YES (vehicle stopped), the process proceeds to Step S2, and if NO (vehicle traveling, etc.), Step S1 is repeated. Here, whether or not the vehicle is "stopped" is determined from a plurality of pieces of information, such as vehicle speed VSP information from the vehicle speed sensor 71.

In Step S2, following the "vehicle stopped" determination in Step S1, it is determined whether or not there is a power generation request from the driver. In the case of YES (power generation request present), the process proceeds to Step S3, and if NO (power generation request absent), the process proceeds to Step S4. Here, a "power generation request from the driver" is a case in which, for example, the driver operates a "power generation request switch" provided on an instrument panel, or the like, inside the vehicle, to turn the switch ON. This information is input into the hybrid control module 21, for example.

In Step S3, following the determination of "power generation request present" in Step S2, it is determined whether or not the requested generated electrical power from the driver is greater than a predetermined value. In the case of YES (requested generated electrical power>predetermined value), the process proceeds to Step S12, and if NO (requested generated electrical power≤predetermined value), the process proceeds to Step S13. Here, regarding the "requested generated electrical power from the driver," for example, a driver operates a dial provided together with the "power generation request switch" described above, and the requested generated electrical power is set according to the position of the dial. This information is input into the hybrid control module 21, for example. In addition to the dial described above, switching between a plurality of stages, such as "large" and "small," is also possible. In short, any configuration can be employed as long as a requested generated electrical power can be set. Additionally, "predetermined value" is the same as the "predetermined value" of Step S10 described further below.

In Step S4, following the determination of "power generation request absent" in Step S2, it is determined whether or not there has been a switch from the P range to the D range by a selection operation of the driver on the select lever. In the case of YES (P→D selected), the process proceeds to Step S18, and if NO (P→D not selected), the process proceeds to Step S5. Here, the P range, the D range, or the like, is determined by acquiring information from an inhibitor switch 77 that detects the position of the select lever (P range, D range, N range, R range, and the like). For example, if the P range is selected in the current process and it is switched to the D range in the subsequent process, it is determined that "P→D selected."

In Step S5, following the determination of "P→D not selected" in Step S4, it is determined whether or not the battery SOC is below a first capacity threshold value. In the case of YES (battery SOC<first capacity threshold value, battery capacity (battery SOC) insufficient), the process proceeds to Step S6, and if NO (battery SOC≥first capacity threshold value, battery capacity (battery SOC) sufficient), the process proceeds to Step S18. Here, "battery SOC" is the battery capacity (charge capacity) of the high-power battery 3, and battery SOC information is acquired by a battery SOC sensor 78. In addition, the "first capacity threshold value" is a threshold value for separating the presence/absence of a battery SOC request (charging request). Additionally, this "first capacity threshold value" may separate the presence/ absence of a battery SOC request (charging request), in consideration of not using such a low battery SOC region that may adversely affect the service life of the high-power battery 3. This "first capacity threshold value" is, for example, a battery SOC of 50%.

In Step S6, following the determination of "battery SOC<first capacity threshold value" in Step S5, it is determined whether or not a road surface gradient has been detected. In the case of YES (road surface gradient detected (a sloped road)), the process proceeds to Step S13, and if NO (road surface gradient not detected (not a sloped road)), the process proceeds to Step S7. Here, the "road surface gradient" is the longitudinal gradient θ [rad] of the road on which the hybrid vehicle is stopped, and is detected by a road surface gradient sensor 79. The road surface gradient may be estimated from a reading of a longitudinal G sensor instead of using a road surface gradient sensor 79.

In Step S7, following the determination of "road surface gradient not detected" in Step S6, it is determined whether the brake switch 80 is ON or OFF. In the case of YES (brake switch ON), the process proceeds to Step S9, and if NO (brake switch OFF), the process proceeds to Step S8.

In Step S8, following the determination that the "brake switch is OFF" in Step S7, it is determined whether or not the P range (parking range) is selected, by a selection operation of the driver on the select lever. In the case of YES (P range), the process proceeds to Step S9, and if NO (N, D range, etc.), the process proceeds to Step S13. Whether or not the "P range" is selected is determined by acquiring information from the inhibitor switch 77 (P range, D range, N range, R range, and the like).

In Step S9, following the determination that the "brake switch is ON" in Step S7, or the determination of "P range" in Step S8, it is determined whether or not the battery SOC is below a second capacity threshold value. In the case of YES (battery SOC<second capacity threshold value), the process proceeds to Step S10, and if NO (battery SOC≥second capacity threshold value), the process proceeds to Step S11. Here, the "battery SOC" is as described above. In addition, the "second capacity threshold value" is a threshold value for separating whether the request level is high or low, when there is a battery SOC request. In other words, the threshold value is used to determine whether or not the request level is that of rapid charging. This "second capacity threshold value" is, for example, a battery SOC of 45%.

In Step S10, following the determination of "battery SOC<second capacity threshold value" in Step S9, it is determined whether or not the MG2 electrical power generation capability of the second motor/generator MG2 is greater than a predetermined value. In the case of YES (MG2 electrical power generation capability>predetermined value), the process proceeds to Step S14, and if NO (MG2 electrical power generation capability≤predetermined value), the process proceeds to Step S15. Here, the "MG2 electrical power generation capability" is the electrical power generation capability of the second motor/generator MG2. This MG2 electrical power generation capability is determined, for example, from the MG2 temperature, by acquiring MG2 temperature information with the MG2 temperature sensor 81 of the second motor/generator MG2. That is, the MG2 electrical power generation capability becomes smaller as the MG2 temperature is increased, and the MG2 electrical power generation capability becomes larger as the MG2 temperature is decreased. In addition, the "predetermined value" is set to a value at which the second motor/generator MG2 is able to continuously generate power for a predetermined time. This value is set according to the capability of the second motor/generator MG2, and is, for example, 15 kW.

In Step S11, following the determination of "battery SOC≥second capacity threshold value" in Step S9, it is determined whether or not the MG2 electrical power generation capability of the second motor/generator MG2 is greater than a predetermined value. In the case of YES (MG2 electrical power generation capability>predetermined value), the process proceeds to Step S16, and if NO (MG2 electrical power generation capability≤predetermined value), the process proceeds to Step S17. Here, "MG2 electrical power generation capability" and "predetermined value" are as described above.

In Step S12, following the determination of "requested generated electrical power>predetermined value" in Step S3, MG1 idle power generation is carried out, in which power is generated in the first motor/generator MG1 by the internal combustion engine ICE while the vehicle is stopped, and the process proceeds to END. MG1 idle power generation (MG1 power generation) corresponding to the requested generated electrical power from the driver is carried out after switching to the "EV-ICEgen" gear shift stage. Here, the operating point of the internal combustion engine ICE at the time of MG1 idle power generation is determined in consideration of generated electrical power, power generation efficiency, and sound and vibration. However, if the engine rotation speed is determined with priority given to power generation efficiency, there are cases in which the sound and vibration are increased, imparting discomfort to the driver. Accordingly, in such cases, sound and vibration is given priority over power generation efficiency, and the ICE rotational speed (engine rotation speed) is reduced to increase the ICE torque.

In Step S13, following the determination of "requested generated electrical power≤predetermined value" in Step S3, the determination of "road surface gradient detected" in Step S6, or the determination of "N, D range, etc." in Step S8, an MG2 idle power generation is carried out, in which power is generated in the second motor/generator MG2 by the internal combustion engine ICE while the vehicle is stopped, and the process proceeds to END. The MG2 idle power generation (MG2 power generation) is carried out after switching to the "EV 1st ICE-" gear shift stage.

In Step S14, following the determination of "MG2 electrical power generation capability>predetermined value" in Step S10, double idle power generation (double power generation (not limited)) is carried out, in which MG2 idle power generation (for example, power generation at 15 kW) is carried out in addition to MG1 idle power generation while the vehicle is stopped, and the process proceeds to END. Double idle power generation is carried out after switching to the "EV-ICEgen" gear shift stage.

In Step S15, following the determination that "MG2 electrical power generation capability≤predetermined value" in Step S10, double idle limited power generation (double power generation (limited)) is carried out, in which MG2 idle limited power generation (for example, power generation at 5 kW), wherein the MG2 idle power generation is limited, is carried out in addition to MG1 idle power generation, and the process proceeds to END. That is, the MG2 idle power generation is limited by the determination that "MG2 electrical power generation capability≤predetermined value" in Step S10. Double idle limited power generation is carried out after switching to the "EV-ICEgen" gear shift stage.

In Step S16, following the determination that "MG2 electrical power generation capability>predetermined value" in Step S11, MG2 idle power generation is carried out while the vehicle is stopped, in the same manner as in Step S13, and the process proceeds to END. MG2 idle power generation is carried out after switching to the "EV 1st ICE-" gear shift stage.

In Step S17, following the determination that "MG2 electrical power generation capability≤predetermined value" in Step S11, MG1 idle power generation is carried out while the vehicle is stopped, in the same manner as in Step S12, and the process proceeds to END. That is, since MG2 idle power generation is limited by the determination that "MG2 electrical power generation capability≤predetermined value" in Step S11, the second motor/generator MG2 is not used for power generation. MG1 idle power generation is carried out after switching to the "EV-ICEgen" gear shift stage.

In Step S18, following the determination of "P→D selected" in Step S4, or the determination that "battery SOC≥first capacity threshold value" in Step S5, power generation is not carried out in the first motor/generator MG1 or the second motor/generator MG2, and the process proceeds to END. In addition, in Step S18, if the first motor/generator MG1 is mechanically coupled to the drive wheels 19, the coupling is maintained. On the other hand, if the first motor/generator MG1 is not mechanically coupled to the drive wheels 19, a clutch changeover is carried out to engage the third engagement clutch C3, such that the first motor/generator and the drive wheels are mechanically coupled. This is in preparation for an EV start (motor start) request.

Next, the actions are described. The "action of the power generation control process," and the "characteristic action of the power generation control" will be described separately, regarding the actions of the power generation control device for a hybrid vehicle according to the first embodiment.

Action of the Power Generation Control Process

The "action of the power generation control process when executing MG1 idle power generation," the "action of the power generation control process when executing MG2 idle power generation," the "action of the power generation control process when executing double idle power generation," and the "action of the power generation control process when executing double idle limited power generation" will be separately described below, regarding the actions of the power generation control process, based on the flowchart illustrated in FIG. 5. In all of the control process actions, Step S1 in the flowchart illustrated in FIG. 5 is repeated until it is determined that the hybrid vehicle is stopped. Then, in all of the control process actions, the flow that progresses from Step S1 to Step S2 is the same, when it is determined that the vehicle is stopped in Step S1.

Figure 6:
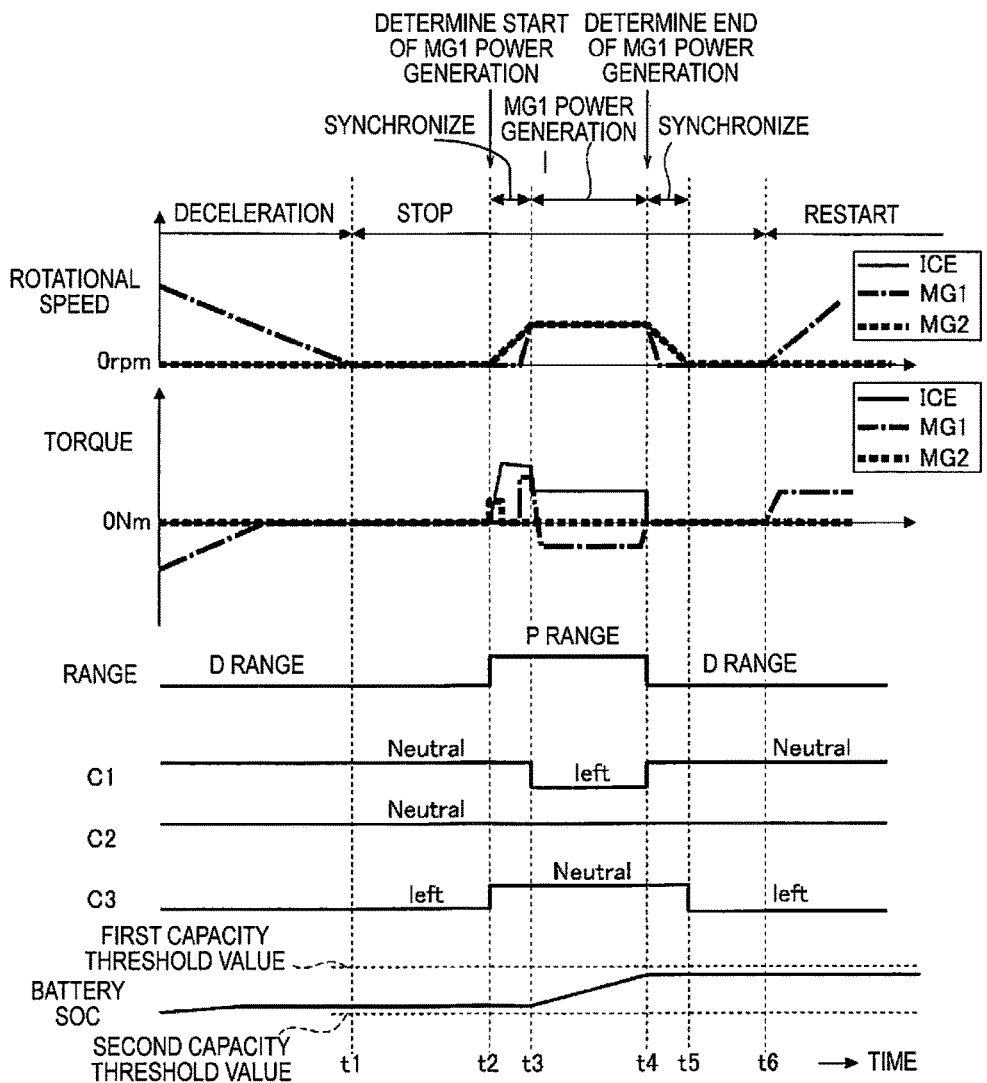
FIG. 6 is a time chart illustrating the respective characteristics of ICE, MG1, MG2 rotational speed/ICE, MG1, MG2 torque range/engagement clutches C1, C2, C3/battery SOC, when executing MG1 idle power generation in the hybrid vehicle of the first embodiment.

First, the action of the power generation control process when executing MG1 idle power generation is described based on the flowchart of FIG. 5; then, each of the steps of the configured power generation control process when executing MG1 idle power generation is described based on the operation example of the time chart of FIG. 6.

If the vehicle is stopped and it is determined that a "power generation request from driver is present," the process proceeds from START→Step S1→Step S2→Step S3 in the flowchart of FIG. 5. In Step S3, it is determined whether or not the requested generated electrical power from the driver is greater than a predetermined value (requested generated electrical power>predetermined value). If it is determined that the "requested generated electrical power>predetermined value" in Step S3, the process proceeds from Step S3 to Step S12. Then, in Step S12, MG1 idle power generation corresponding to the requested generated electrical power from the driver is carried out. That is, the power generation control process when MG1 idle power generation is carried out is the sequence of steps that proceeds from START→Step S1→Step S2→Step S3→Step S12→END in the flowchart of FIG. 5.

Next, if the vehicle is stopped and it is determined that a "power generation request from driver is absent," the process proceeds from START→Step S1→Step S2→Step S4 in the flowchart of FIG. 5. In Step S4, it is determined whether or not there has been a switch from the P range to the D range by a selection operation of the driver. If it is determined that "P→D not selected" in Step S4, the process proceeds to Step S5. In Step S5, it is determined whether or not the battery SOC is below a first capacity threshold value (battery SOC<first capacity threshold value). If it is determined that "battery SOC<first capacity threshold value" in Step S5, the process proceeds to Step S6.

Then, in Step S6, it is determined whether or not a road surface gradient has been detected. If it is determined that a "road surface gradient is not detected" in Step S6, the process proceeds from Step S6 to Step S7. In Step S7, it is determined whether the brake switch is ON or OFF. If it is determined that the "brake switch is ON" in Step S7, the process proceeds from Step S7 to Step S9. On the other hand, if it is determined that the "brake switch is OFF" in Step S7, the process proceeds from Step S7 to Step S8. In Step S8, it is determined whether or not the range is the P range. If "P range" is determined in Step S8, the process proceeds from Step S8 to Step S9. That is, if it is determined that the "brake switch is ON" in Step S7, or if "P range" is determined in Step S8, the process proceeds from Step S7 or Step S8 to Step S9.

Furthermore, in Step S9, it is determined whether or not the battery SOC is below a second capacity threshold value (battery SOC<second capacity threshold value). If it is determined that "battery SOC≥second capacity threshold value" in Step S9, the process proceeds to Step S11. In Step S11, it is determined whether or not the MG2 electrical power generation capability is greater than a predetermined value (MG2 electrical power generation capability>predetermined value). If it is determined that "MG2 electrical power generation capability>predetermined value" in Step S11, the process proceeds from Step S11 to Step S17. Then, in Step S17, MG1 idle power generation is carried out. That is, the power generation control process when MG1 idle power generation is carried out is the sequence of steps that proceeds from START→Step S1→Step S2→Step S4→Step S5→Step S6→Step S7→(Step S8→) Step S9→Step S11→Step S17→END in the flowchart of FIG. 5.

Next, each of the time variables will be described based on the operation example shown in the time chart of FIG. 6. Each of the steps of the configured power generation control process when carrying out MG1 idle power generation, in a case in which it is determined that a "power generation request from driver is absent," will be described below based on the time chart of FIG. 6. The preconditions of FIG. 6 shall be that it is determined that a "road surface gradient is not detected," that the "brake switch is OFF," and that the "MG2 electrical power generation capability≤predetermined value."

The hybrid vehicle is decelerating prior to time t1, as illustrated in FIG. 6, and the rotational speed becomes zero at time t1, as illustrated in FIG. 6. Next, it is determined whether or not the vehicle is stopped between time t1 and time t2. Next, it is determined that the vehicle is stopped at time t2. That is, the time up to time t2 corresponds to the repetition of Step S1 in the flowchart of FIG. 5.

In addition, at time t2, "second capacity threshold value≤battery SOC<first capacity threshold value" is satisfied, and the range is switched from "D range" to "P range," as illustrated in FIG. 6. That is, time t2 corresponds to START→Step S1→Step S2→Step S4→Step S5→Step S6→Step S7→Step S8→Step S9→Step S11→Step S17 in the flowchart of FIG. 5. A case in which the "brake switch is ON" is determined corresponds to Step S7→Step S9 in the flowchart of FIG. 5.

Figure 7:
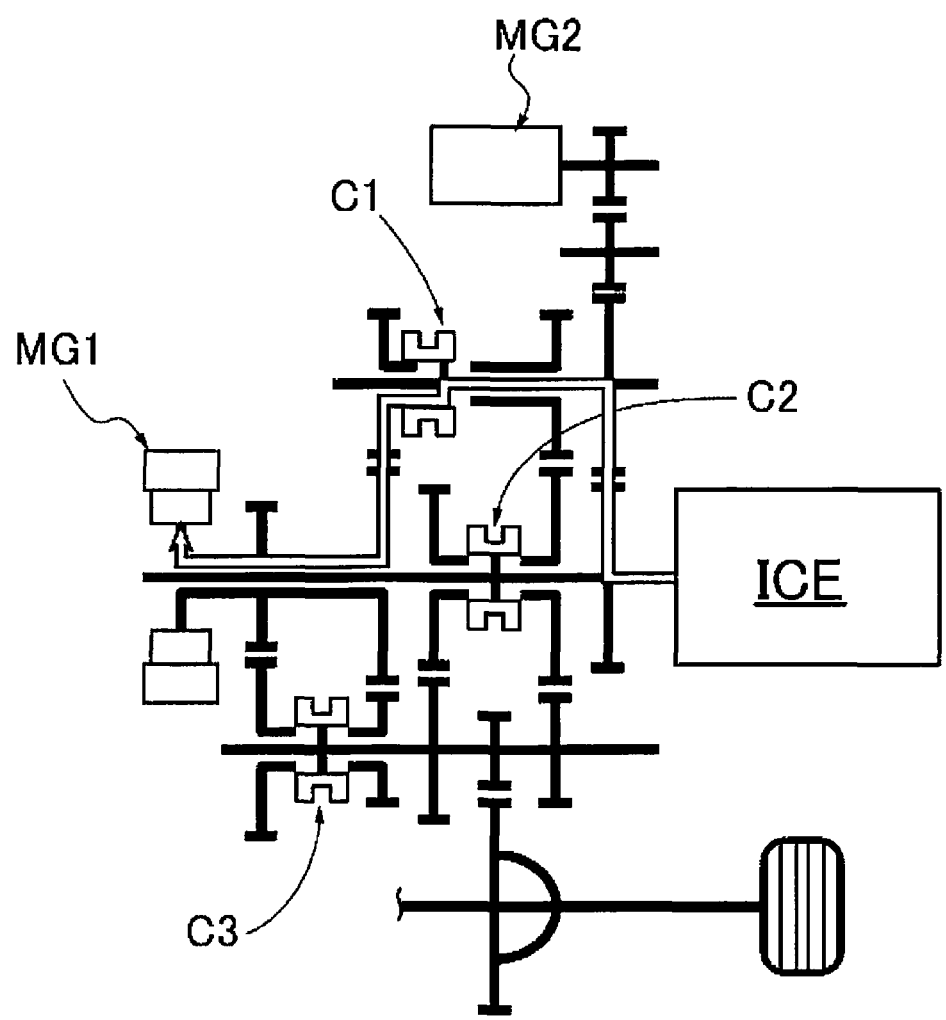
FIG. 7 is a torque flow diagram illustrating the transmission path of the ICE torque in the multistage gear transmission, when the "EV-ICEgen" gear shift stage is selected during MG1 idle power generation.

Then, from time t2, the gear shift stage "EV 1st ICE-" of prior to time t2 is switched to "EV-ICEgen" shown in FIG. 7, in order to carry out MG1 idle power generation. That is, in the case of the "EV-ICEgen" gear shift stage, one first engagement clutch C1 (Left) is present in the power transmission path from the internal combustion engine ICE to the first motor/generator MG1, as illustrated in FIG. 7. Accordingly, first, at time t2, the torque of the internal combustion engine ICE, and the like, is zero, and a clutch changeover is carried out to release the third engagement clutch C3 ("Left"→"N"), as illustrated in FIG. 6. Next, between time t2 and time t3, the internal combustion engine ICE is subjected to MG2 start, using the second motor/generator MG2 as the starter motor from time t2. Next, after the internal combustion engine ICE is started, the first motor/generator MG1 is driven to bring the first engagement clutch C1 into a rotationally synchronized state. Next, at time t3, a clutch changeover is carried out to engage the first engagement clutch C1 in a rotationally synchronized state ("N"→"Left"), as illustrated in FIG. 6. As a result, MG1 idle power generation is executed (started) with a slight delay from time t3, in the "EV-ICEgen" gear shift stage, as illustrated in FIG. 6.

The flow of the ICE torque (torque of the internal combustion engine ICE) of the internal combustion engine ICE in the multistage gear transmission 1 when the "EV-ICEgen" gear shift stage is selected at this time will be described based on FIG. 7. In the "EV-ICEgen" gear shift stage, the first engagement clutch C1 is in the "Left" position, the second engagement clutch C2 is in the "N" position, and the third engagement clutch C3 is in the "N" position. Therefore, the ICE torque flows from the internal combustion engine ICE to the first shaft 11→the first gear 101→the eleventh gear 111→the fourth shaft 14→the thirteenth gear 113→the fourth gear 104→the second shaft 12→the first motor/generator MG1. That is, the first motor/generator MG1 and the drive wheels 19 are disconnected while the vehicle is stopped, the first motor/generator MG1 and the internal combustion engine ICE are connected, and MG1 idle power generation is carried out by the ICE torque.

Between time t3 and time t4, the battery SOC is gradually increased by the MG1 idle power generation.

At time t4, the "P range" is switched to the "D range," and MG1 idle power generation is ended, as illustrated in FIG. 6. That is, the period from time t2 to immediately before time t4 corresponds to the repetition of START→Step S1→Step S2→Step S4→Step S5→Step S6→Step S7→Step S8→Step S9→Step S11→Step S17→END in the flowchart of FIG. 5. Additionally, the time t4 corresponds to Step S1→Step S2→Step S4→Step S18 in the flowchart of FIG. 5.

In addition, at time t4, the switchover of the engagement clutches C1, C3 is carried out in preparation for a restart (EV start), and the gear shift stage is switched from "EV-ICEgen" to "EV 1st ICE-." First, the ICE torque (clutch transmission torque) is reduced, and when the ICE torque becomes zero, a clutch changeover is carried out to release the first engagement clutch C1 ("Left"→"N"), as illustrated in FIG. 6. Next, between time t4 to time t5, the internal combustion engine ICE is stopped and the rotational speed of the first motor/generator MG1 is synchronized with the rotational speed of the drive wheels 19. That is, the first motor/generator MG1 is stopped. Next, at time t5, a clutch changeover is carried out to engage the third engagement clutch C3 in a rotationally synchronized state ("N"→"Left"). That is, the third engagement clutch C3 is set in a position for starting, in preparation for a starting request. Then, at time t6, the hybrid vehicle undergoes an EV start in the "EV 1st ICE-" gear shift stage. Although the second motor/generator MG2 is rotating between time t2 and time t5, this is due to the rotation of the internal combustion engine ICE, and since MG2 idle power generation is limited according to "MG2 electrical power generation capability≤predetermined value," the second motor/generator MG2 is not used for power generation.

Figure 8:
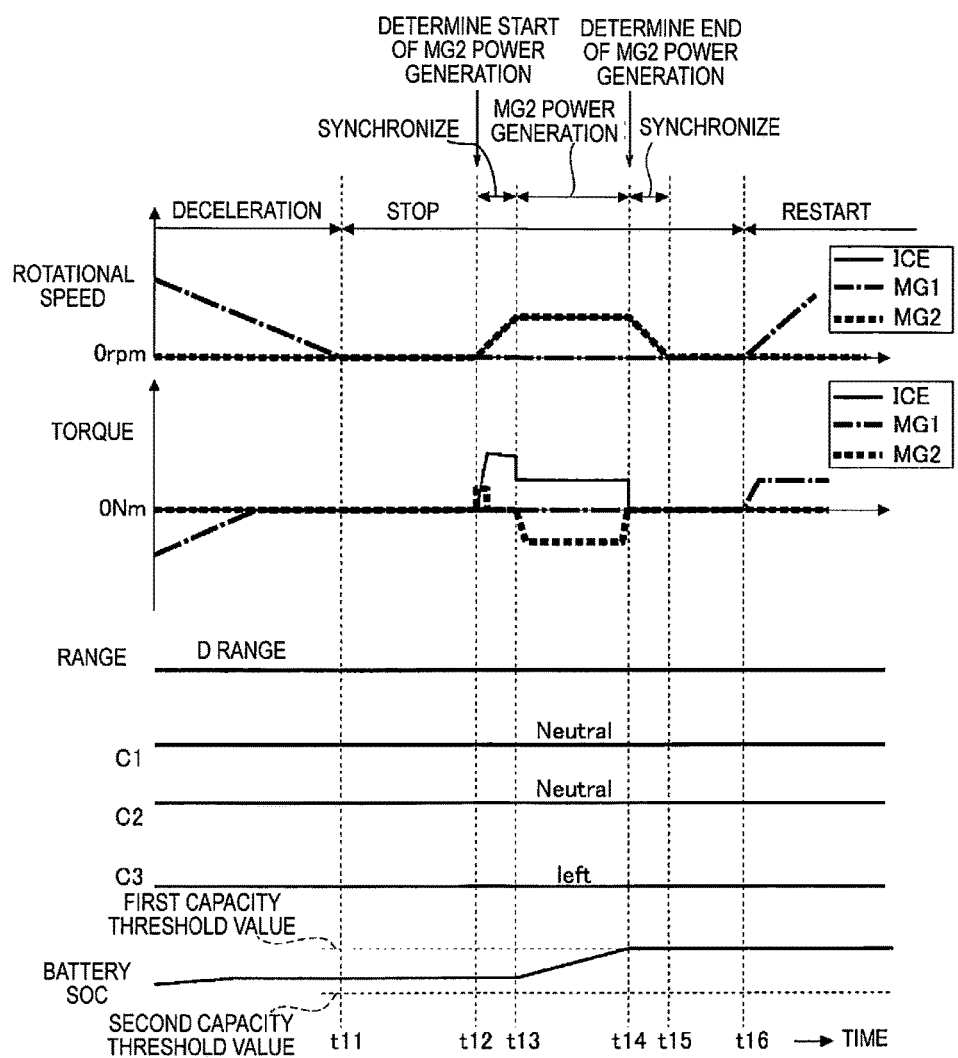
FIG. 8 is a time diagram illustrating the respective characteristics of ICE, MG1, MG2 rotational speed/ICE, MG1, MG2 torque range/engagement clutches C1, C2, C3/battery SOC, when executing MG2 idle power generation in the hybrid vehicle of the first embodiment.

First, the action of the power generation control process when executing MG2 idle power generation is described based on the flowchart of FIG. 5; then, each of the steps of the configured power generation control process when executing MG2 idle power generation is described, based on the operation example of the time chart of FIG. 8.

If the vehicle is stopped and it is determined that a "power generation request from driver is present," the process proceeds from START→Step S1→Step S2→Step S3 in the flowchart of FIG. 5. In Step S3, it is determined whether or not the requested generated electrical power from the driver is greater than a predetermined value (requested generated electrical power>predetermined value). If it is determined that the "requested generated electrical power≤predetermined value" in Step S3, the process proceeds from Step S3 to Step S13. Then, in Step S13, MG2 idle power generation is carried out. That is, the power generation control process when MG2 idle power generation is carried out is the sequence of steps that proceeds from START→Step S1→Step S2→Step S3→Step S13→END in the flowchart of FIG. 5.

Next, if the vehicle is stopped and it is determined that a "power generation request from driver is absent," the process proceeds from START→Step S1→Step S2→Step S4 in the flowchart of FIG. 5. Here, since the sequence of steps that proceeds from Step S4 to Step S6 is the same as in the "Action of the power generation control process when executing MG1 idle power generation," the description thereof will be omitted.

Then, in Step S6, it is determined whether or not a road surface gradient has been detected. If it is determined that a "road surface gradient is detected" in Step S6, the process proceeds from Step S6 to Step S13. That is, the power generation control process when MG2 idle power generation is carried out is the sequence of steps that proceeds from START→Step S1→Step S2→Step S4→Step S5→Step S6→Step S13→END in the flowchart of FIG. 5.

On the other hand, if it is determined that a "road surface gradient is not detected" in Step S6, the process proceeds from Step S6 to Step S7. In Step S7, it is determined whether the brake switch is ON or OFF. If it is determined that the "brake switch is OFF" in Step S7, the process proceeds from Step S7 to Step S8. In Step S8, it is determined whether or not the range is the P range. If "N, D range, etc." is determined in Step S8, the process proceeds from Step S8 to Step S13. That is, if it is determined that the "brake switch is OFF" in Step S7 together with a determination of "N, D range, etc." in Step S8, the process proceeds from Step S8 to Step S13. Accordingly, the power generation control process when MG2 idle power generation is carried out is the sequence of steps that proceeds from START→Step S1→Step S2→Step S4→Step S5→Step S6→Step S7→Step S8→Step S13→END in the flowchart of FIG. 5.

Next, if it is determined that the "brake switch is ON" in Step S7, or if "P range" is determined in Step S8, the process proceeds from Step S7 or Step S8 to Step S9. Here, since the sequence of steps that proceeds from Step S7 or Step S8 to Step S11 is the same as in the "Action of the power generation control process when executing MG1 idle power generation," the description thereof will be omitted.

Additionally, in Step S11, it is determined whether or not the MG2 electrical power generation capability is greater than a predetermined value (MG2 electrical power generation capability>predetermined value). If it is determined that "MG2 electrical power generation capability>predetermined value" in Step S11, the process proceeds from Step S11 to Step S16. Then, in Step S16, MG2 idle power generation is carried out. That is, the power generation control process when MG2 idle power generation is carried out is the sequence of steps that proceeds from START→Step S1→Step S2→Step S4→Step S5→Step S6→Step S7→(Step S8→) Step S9→Step S11→Step S16→END in the flowchart of FIG. 5.

Next, each of the time variables will be described based on the operation example shown in the time chart of FIG. 8. Each of the steps of the configured MG2 idle power generation control process, in a case in which it is determined that a "power generation request from driver is absent," will be described below based on the time chart of FIG. 8. The precondition of FIG. 8 shall be that it is determined that a "road surface gradient is detected."

First, the description up to time t12 is the same as the description up to time t2 in the time chart of FIG. 6 and is thus omitted.

At time t12, "battery SOC<first capacity threshold value" is satisfied, as illustrated in FIG. 8. That is, time t12 corresponds to START→Step S1→Step S2→Step S4→Step S5→Step S6→Step S13 in the flowchart of FIG. 5. Since the determination of "D range" is continued, as illustrated in FIG. 8, a case in which the determination that the "brake switch is OFF" is continued and it is determined that a "road surface gradient is not detected" corresponds to Step S6→Step S7→Step S8→Step S13 in the flowchart of FIG. 5.

Figure 9:
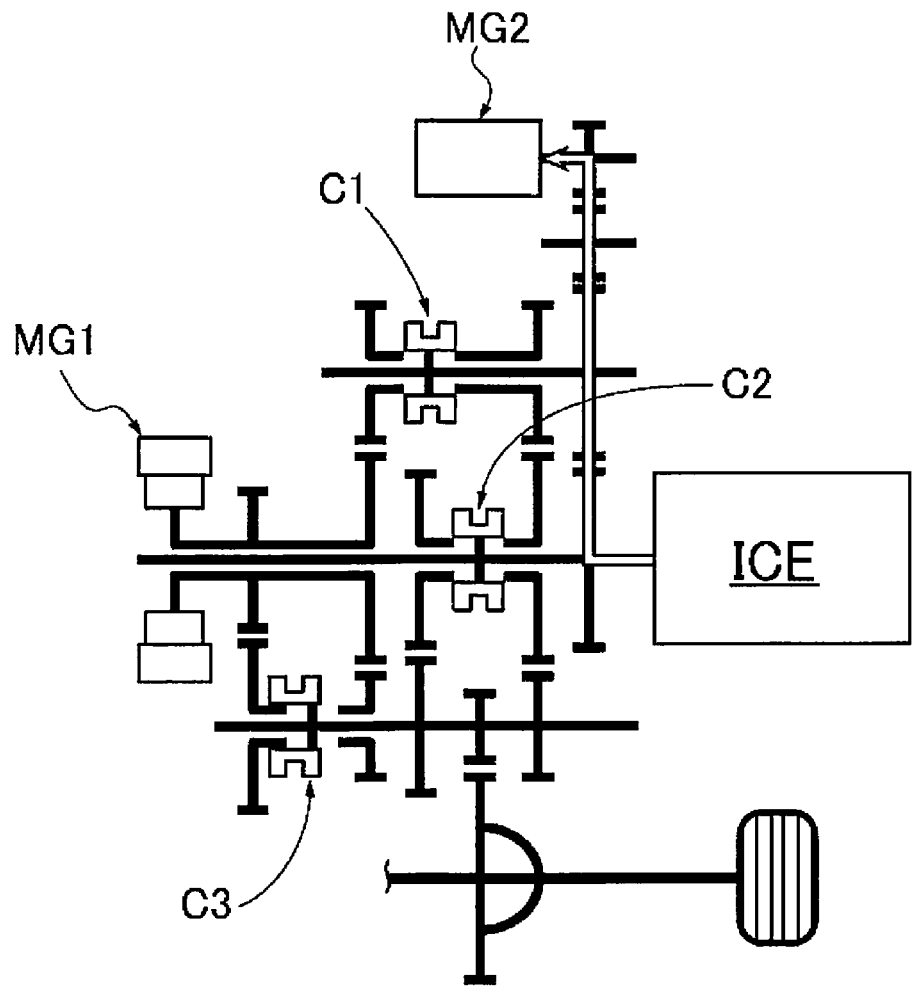
FIG. 9 is a torque flow diagram illustrating the transmission path of the ICE torque in the multistage gear transmission, when the "EV 1st ICE-" gear shift stage is selected during MG2 idle power generation.

Then, from time t12, the internal combustion engine ICE undergoes an MG2 start, where the second motor/generator MG2 is used as a starter motor, between time t12 to time t13, in order to carry out MG2 idle power generation. Since the gear shift stage is "EV 1st ICE-" if it is determined that the vehicle is stopped, the gear shift stage is not switched, and the same gear shift stage is maintained. As a result, MG2 idle power generation is executed (started) with a slight delay from time t13, in the "EV 1st ICE-" gear shift stage, as illustrated in FIG. 8 and FIG. 9.

The flow of the ICE torque of the internal combustion engine ICE in the multistage gear transmission 1 when the "EV 1st ICE-" gear shift stage is selected at this time will be described based on FIG. 9. In the "EV 1st ICE-" gear shift stage, the first engagement clutch C1 is in the "N" position, the second engagement clutch C2 is in the "N" position, and the third engagement clutch C3 is in the "Left" position. Therefore, the ICE torque flows from the internal combustion engine ICE to the first shaft 11→the first gear 101→the eleventh gear 111→the fourteenth gear 114→the fifteenth gear 115→the sixth shaft 16→the second motor/generator MG2. That is, the first motor/generator MG1 remains mechanically coupled to the drive wheels 19.

Between time t13 and time t14, the battery SOC is gradually increased by the MG2 idle power generation.

At time t14, the battery SOC becomes equal to or greater than the first capacity threshold value (battery SOC threshold≥first capacity threshold value), and MG2 idle power generation is ended, as illustrated in FIG. 8. That is, the period from time t12 to immediately before time t14, at which "battery SOC≥first capacity threshold value" is satisfied, corresponds to the repetition of START→Step S1→Step S2→Step S4→Step S5→Step S6→Step S13→END in the flowchart of FIG. 5. Additionally, the time t14 corresponds to Step S1→Step S2→Step S4→Step S5→Step S18 in the flowchart of FIG. 5. Since the gear shift stage is already "EV 1st ICE-" for restarting (EV start) at time t14 as well as the period from time t14 to time t15, the gear shift stage is not switched, and the same gear shift stage is maintained. Then, at time t16, the hybrid vehicle undergoes an EV start in the "EV 1st ICE-" gear shift stage.

Figure 10:
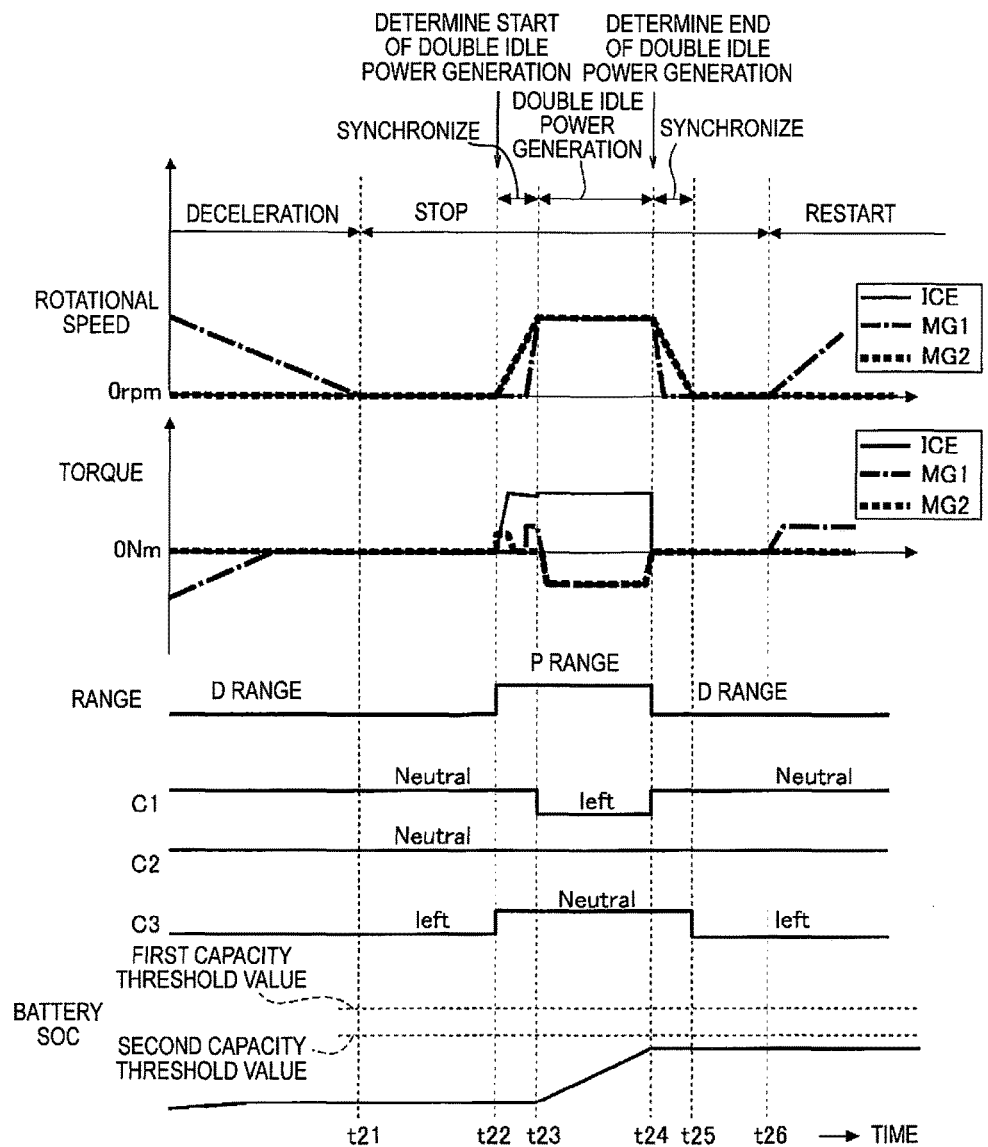
FIG. 10 is a time chart illustrating the respective characteristics of ICE, MG1, MG2 rotational speed/ICE, MG1, MG2 torque range/engagement clutches C1, C2, C3/battery SOC, when executing double idle power generation in the hybrid vehicle of the first embodiment.

First, the action of the power generation control process when executing double idle power generation is described based on the flowchart of FIG. 5; then, each of the steps of the configured power generation control process when executing double idle power generation is described based on the operation example of the time chart of FIG. 10.

If the vehicle is stopped and it is determined that a "power generation request from driver is absent," the process proceeds from START→Step S1→Step S2→Step S4 in the flowchart of FIG. 5. Here, since the sequence of steps that proceeds from Step S4 to Step S9 is the same as in the "Action of the power generation control process when executing MG1 idle power generation," the description thereof will be omitted.

Additionally, in Step S9, it is determined whether or not the battery SOC is below a second capacity threshold value (battery SOC<second capacity threshold value). If it is determined that "battery SOC<second capacity threshold value" in Step S9, the process proceeds to Step S10. In Step S10, it is determined whether or not the MG2 electrical power generation capability is greater than a predetermined value (MG2 electrical power generation capability>predetermined value). If it is determined that "MG2 electrical power generation capability>predetermined value" in Step S10, the process proceeds from Step S10 to Step S14. Then, in Step S14, double idle power generation is carried out. That is, the power generation control process when double idle power generation is carried out is the sequence of steps that proceeds from START→Step S1→Step S2→Step S4→Step S5→Step S6→Step S7→(Step S8→Step S9→Step S10→Step S14→END in the flowchart of FIG. 5.

Next, each of the time variables will be described based on the operation example shown in the time chart of FIG. 10. Each of the steps of the configured power generation control process when double idle power generation is carried out, in a case in which it is determined that a "power generation request from driver is absent" will be described below, based on the time chart of FIG. 10. The preconditions of FIG. 10 shall be that it is determined that a "road surface gradient is not detected," that the "brake switch is OFF," and that "MG2 electrical power generation capability>predetermined value."

First, the description up to time t22 is the same as the description up to time t2 in the time chart of FIG. 6 and is thus omitted.

At time t22, "battery SOC<first capacity threshold value" is satisfied, "battery SOC<second capacity threshold value" is satisfied, and the range is switched from "D range" to "P range," as illustrated in FIG. 10. That is, time t22 corresponds to START→Step S1→Step S2→Step S4→Step S5→Step S6→Step S7→Step S8→Step S9→Step S10→Step S14 in the flowchart of FIG. 5. A case in which the determination that the "brake switch is ON" corresponds to Step S7→Step S9 in the flowchart of FIG. 5.

Figure 11:
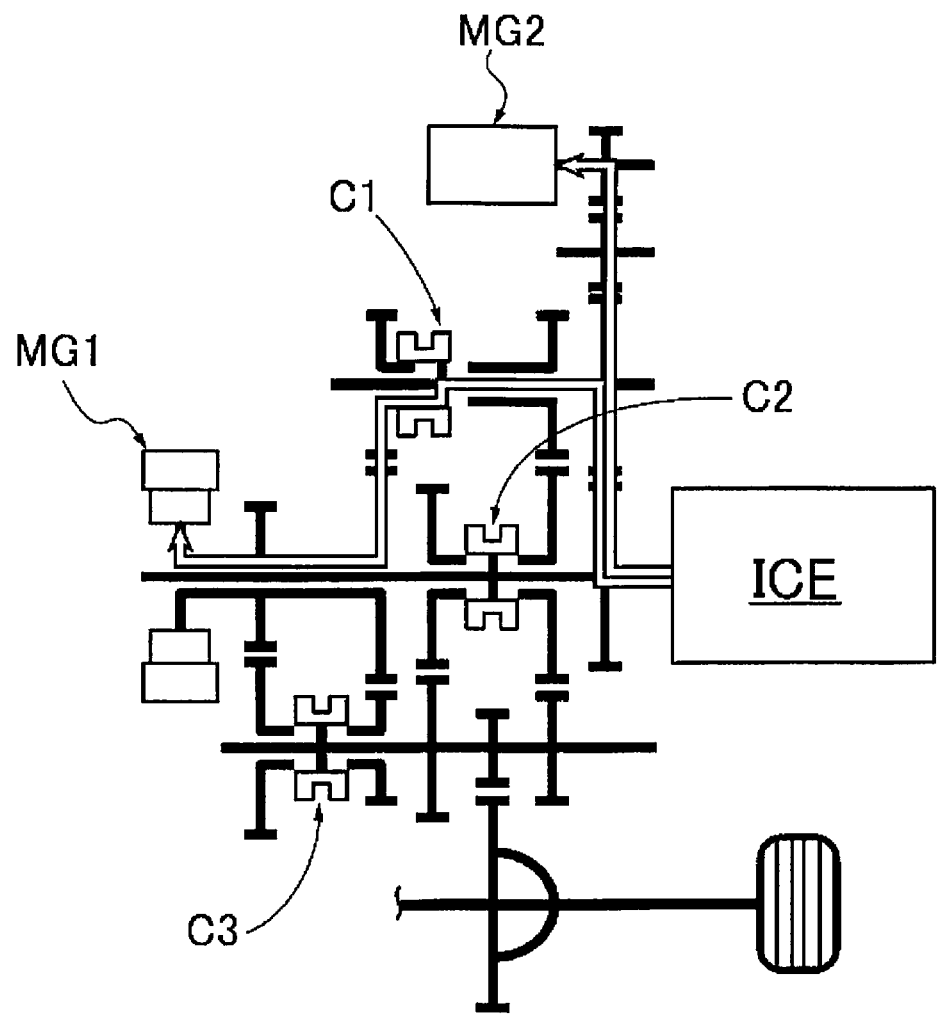
FIG. 11 is a torque flow diagram illustrating the transmission path of the ICE torque in the multistage gear transmission, when the "EV-ICEgen" gear shift stage is selected during double idle power generation.

Then, from time t22, the gear shift stage "EV 1st ICE-" of prior to time t22 is switched to "EV-ICEgen" shown in FIG. 11, in order to carry out double idle power generation. That is, in the case of the "EV-ICEgen" gear shift stage, one first engagement clutch C1 (Left) is present in the power transmission path from the internal combustion engine ICE to the first motor/generator MG1, as illustrated in FIG. 11 (same as in FIG. 7). Here, since the description regarding this switching of the gear shift stage is the same as in the "Action of the power generation control process when executing MG1 idle power generation" and since the description of the period from time t22 to time t23 in FIG. 10 is the same as the description of the period from time t2 to time t3 in the time chart of FIG. 6, the descriptions are omitted. Due to the double idle power generation being carried out, the rotation synchronization speed is higher than that at the time of MG1 idle power generation. As a result, double idle power generation is executed (started), in which MG2 idle power generation is carried out in addition to MG1 idle power generation, with a slight delay from time t23, in the "EV-ICEgen" gear shift stage, as illustrated in FIG. 10 and FIG. 11.

The flow of the ICE torque of the internal combustion engine ICE in the multistage gear transmission 1 when the "EV-ICEgen" gear shift stage is selected at this time will be described based on FIG. 11. In the "EV-ICEgen" gear shift stage, the first engagement clutch C1 is in the "Left" position, the second engagement clutch C2 is in the "N" position, and the third engagement clutch C3 is in the "N" position. Therefore, the ICE torque flows from the internal combustion engine ICE to the first shaft 11→the first gear 101→the eleventh gear 111→the fourth shaft 14→the thirteenth gear 113→the fourth gear 104→the second shaft 12→the first motor/generator MG1. That is, the first motor/generator MG1 and the drive wheels 19 are disconnected while the vehicle is stopped, the first motor/generator MG1 and the internal combustion engine ICE are connected, and MG1 idle power generation is carried out by the ICE torque. In addition, a portion of the ICE torque flows from the internal combustion engine ICE to the first shaft 11→the first gear 101→the eleventh gear 111→the fourteenth gear 114→the fifteenth gear 115→the sixth shaft 16→the second motor/generator MG2.

Between time t23 and time t24, the battery SOC is gradually increased by the double idle power generation. Due to the double idle power generation being carried out, the torque of the internal combustion engine ICE is larger than that at the time of MG1 idle power generation.

At time t24, the "P range" is switched to the "D range," and double idle power generation is ended, as illustrated in FIG. 10. That is, the period from time t22 to immediately before time t24 corresponds to the repetition of START-→Step S1→Step S2→Step S4→Step S5 Step S6→Step S7→Step S8→Step S9→Step S10→Step S14→END in the flowchart of FIG. 5. Additionally, the time t24 corresponds to Step S1→Step S2→Step S4→Step S18 in the flowchart of FIG. 5.

In addition, at time t24, a switchover of the engagement clutches C1, C3 is carried out in preparation for a restart (EV start), and the gear shift stage is switched from "EV-ICEgen" to "EV 1st ICE-." Here, since the description regarding this switching of the gear shift stage is the same as in the "Action of the power generation control process when executing MG1 idle power generation" and since the description of the period from time t24 to time t26 in FIG. 10 is the same as the description of the period from time t4 to time t6 in the time chart of FIG. 6, the descriptions are omitted.

Figure 12:
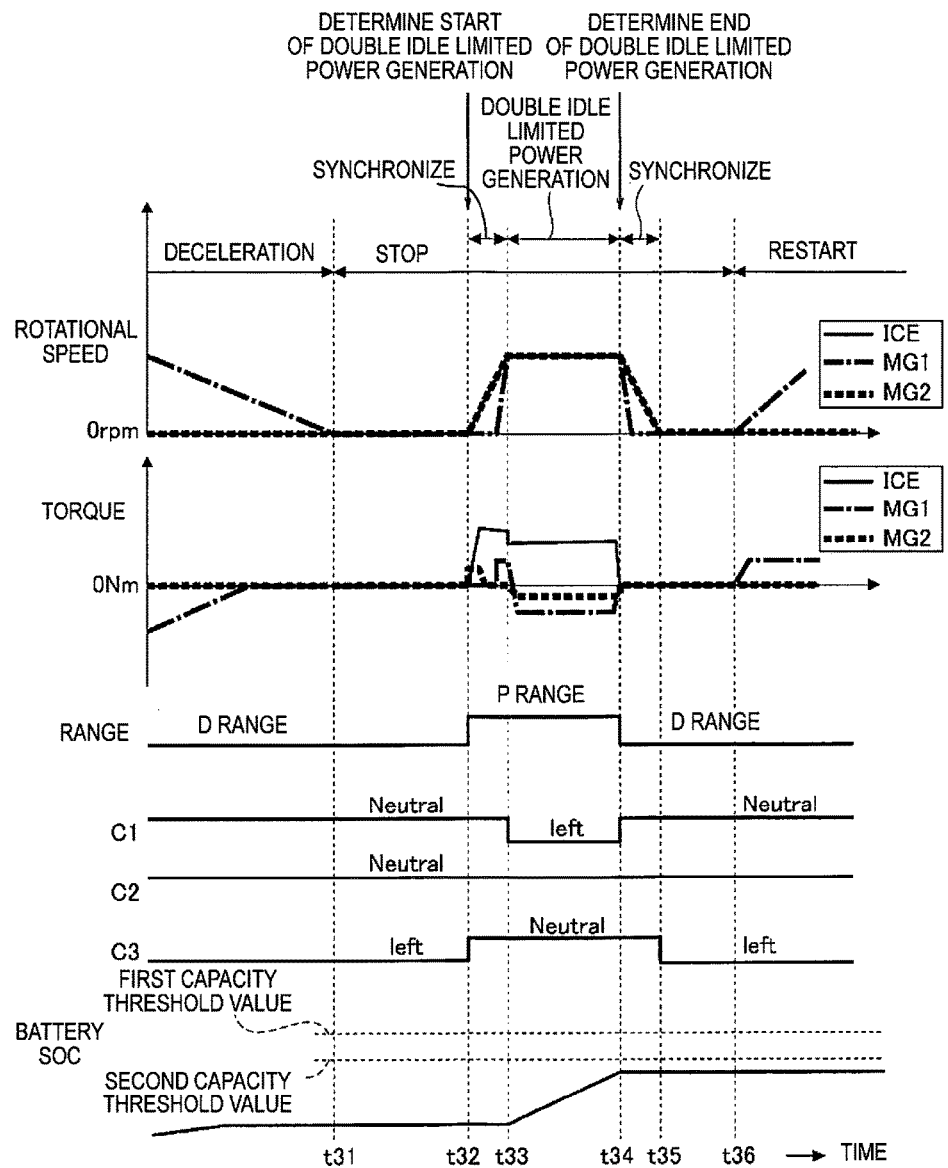
FIG. 12 is a time chart illustrating the respective characteristics of ICE, MG1, MG2 rotational speed/ICE, MG1, MG2 torque range/engagement clutches C1, C2, C3/battery SOC, when executing double idle limited power generation in the hybrid vehicle of the first embodiment.

First, the action of the power generation control process when executing double idle limited power generation is described based on the flowchart of FIG. 5; then, each of the steps of the configured power generation control process when executing double idle limited power generation is described based on the operation example of the time chart of FIG. 12.

If the vehicle is stopped and it is determined that a "power generation request from driver is absent," the process proceeds from START→Step S1→Step S2→Step S4 in the flowchart of FIG. 5. Here, since the sequence of steps that proceeds from Step S4 to Step S10 is the same as in the "Action of the power generation control process when executing double idle power generation," the description thereof will be omitted.

Additionally, in Step S10, it is determined whether or not the MG2 electrical power generation capability is greater than a predetermined value (MG2 electrical power generation capability>predetermined value). If it is determined that "MG2 electrical power generation capability>predetermined value" in Step S10, the process proceeds from Step S10 to Step S15. Then, in Step S15, double idle limited power generation is carried out. That is, the power generation control process when double idle limited power generation is carried out is the sequence of steps that proceeds from START→Step S1→Step S2→Step S4→Step S5→Step S6→Step S7→(Step S8→) Step S9→Step S10→Step S15→END in the flowchart of FIG. 5.

Next, each of the time variables will be described based on the operation example shown in the time chart of FIG. 12. Each of the steps of the configured power generation control process when carrying out double idle limited power generation, in a case in which it is determined that a "power generation request from driver is absent," will be described below based on the time chart of FIG. 12. The preconditions of FIG. 12 shall be that it has been determined that a "road surface gradient is not detected," that the "brake switch is OFF," and that "MG2 electrical power generation capability≤predetermined value."

First, the description up to time t32 is the same as the description up to time t2 in the time chart of FIG. 6 and is thus omitted.

At time t32, "battery SOC<first capacity threshold value" is satisfied, "battery SOC<second capacity threshold value" is satisfied, and the range is switched from the "D range" to the "P range," as illustrated in FIG. 12. That is, time t32 corresponds to START→Step S1→Step S2→Step S4→Step S5→Step S6→Step S7→Step S8→Step S9→Step S10→Step S15 in the flowchart of FIG. 5. A case in which the determination that the "brake switch is ON" corresponds to Step S7→Step S9 in the flowchart of FIG. 5.

Figure 13:
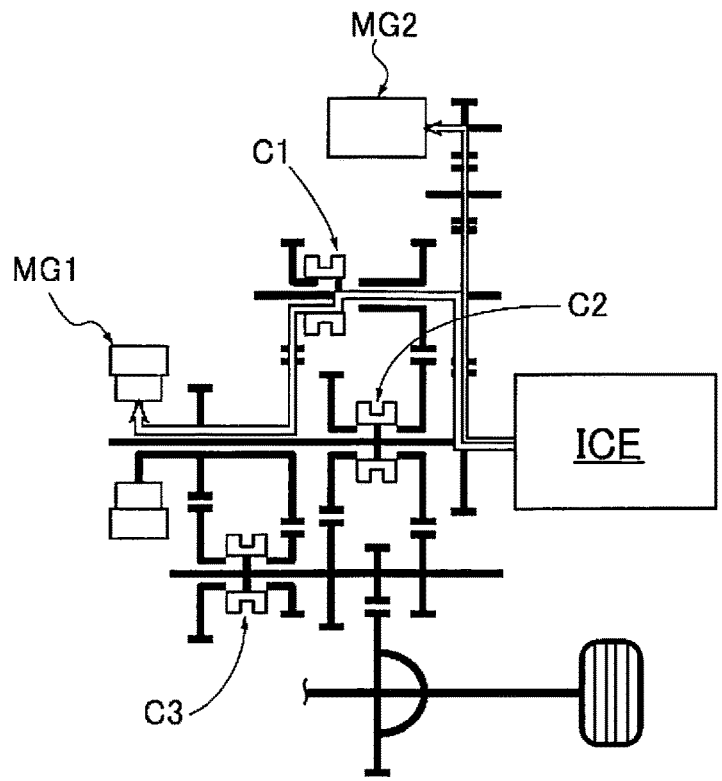
FIG. 13 is torque flow diagram illustrating the transmission path of the ICE torque in the multistage gear transmission, when the "EV-ICEgen" gear shift stage is selected during double idle limited power generation.

Then, from time t32, the gear shift stage "EV 1st ICE-" of prior to time t32 is switched to "EV-ICEgen" shown in FIG. 13, in order to carry out double idle limited power generation. That is, in the case of the "EV-ICEgen" gear shift stage, one first engagement clutch C1 (Left) is present in the power transmission path from the internal combustion engine ICE to the first motor/generator MG1, as illustrated in FIG. 13 (same as in FIGS. 7 and 11). Here, since the description regarding this switching of the gear shift stage is the same as in the "Action of the power generation control process when executing MG1 idle power generation" and since the description of the period from time t32 to time t33 in FIG. 12 is the same as the description of the period from time t2 to time t3 in the time chart of FIG. 6, the descriptions are omitted. Due to the double idle limited power generation being carried out, the rotation synchronization speed is greater than that at the time of MG1 idle power generation. As a result, double idle limited power generation is executed (started), in which MG2 idle limited power generation, wherein power generation is limited compared to MG2 idle power generation due to the establishment of "MG2 electrical power generation capability≤predetermined value," is carried out in addition to MG1 idle power generation, with a slight delay from time t23, in the "EV-ICEgen" gear shift stage, as illustrated in FIG. 12 and FIG. 13.

The flow of the ICE torque of the internal combustion engine ICE in the multistage gear transmission 1 when the "EV-ICEgen" gear shift stage is selected at this time will be described based on FIG. 13. In the "EV-ICEgen" gear shift stage, the first engagement clutch C1 is in the "Left" position, the second engagement clutch C2 is in the "N" position, and the third engagement clutch C3 is in the "N" position. Therefore, a portion of the ICE torque flows from the internal combustion engine ICE to the first shaft 11→the first gear 101→the eleventh gear 111→the fourth shaft 14→the thirteenth gear 113→the fourth gear 104→the second shaft 12→the first motor/generator MG1. That is, the first motor/generator MG1 and the drive wheels 19 are disconnected while the vehicle is stopped, the first motor/generator MG1 and the internal combustion engine ICE are connected, and MG1 idle power generation is carried out by the ICE torque. In addition, a portion of the ICE torque flows from the internal combustion engine ICE to the first shaft 11→the first gear 101→the eleventh gear 111→the fourteenth gear 114→the fifteenth gear 115→the sixth shaft 16→the second motor/generator MG2. Since the second motor/generator MG2 is carrying out MG2 idle limited power generation, the amount of the ICE torque that flows to the first motor/generator MG1 is greater than that which flows to the second motor/generator MG2.

Between time t33 and time t34, the battery SOC is gradually increased by the double idle limited power generation. Due to the double idle limited power generation being carried out, the torque of the internal combustion engine ICE is greater than that at the time of MG1 idle power generation, and the torque of the internal combustion engine ICE is less than that at the time of double idle power generation.

At time t34, the "P range" is switched to the "D range," and double idle limited power generation is ended, as illustrated in FIG. 12. That is, the period from time t32 to immediately before time t34 corresponds to the repetition of START→Step S1→Step S2→Step S4→Step S5→Step S6→Step S7→Step S8→Step S9→Step S10→Step S15→END in the flowchart of FIG. 5. Additionally, the time t34 corresponds to Step S1→Step S2→Step S4→Step S18 in the flowchart of FIG. 5.

In addition, at time t34, a switchover of the engagement clutches C1, C3 is carried out in preparation for a restart (EV start), and the gear shift stage is switched from "EV-ICEgen" to "EV 1st ICE-." Here, since the description regarding this switching of the gear shift stage is the same as in the "Action of the power generation control process when executing MG1 idle power generation" and since the description of the period from time t34 to time t36 in FIG. 12 is the same as the description of the period from time t4 to time t6 in the time chart of FIG. 6, the descriptions are omitted.

Characteristic Action of the Power Generation Control

For example, a conventional power generation control device for a hybrid vehicle that carries out an EV start using a first electric motor, to which electrical power generated in the second electric motor and battery power are supplied, as a drive source, when starting a vehicle, shall be used in a comparative example. According to the power generation control device for a hybrid vehicle of this comparative example, the engine is started according to a charging state of the battery, and the battery is charged by a generator (series hybrid vehicle).

However, the power generation control device for a hybrid vehicle of the comparative example is configured such that only the torque of a starting motor is used when starting, and required electrical power to the starting motor is supplied by battery power and series generated power. Thus, there is the problem that when the required electrical power cannot be provided for by the battery power and the series generated power, such as when the battery SOC is low, the vehicle cannot be started.

Figure 14:
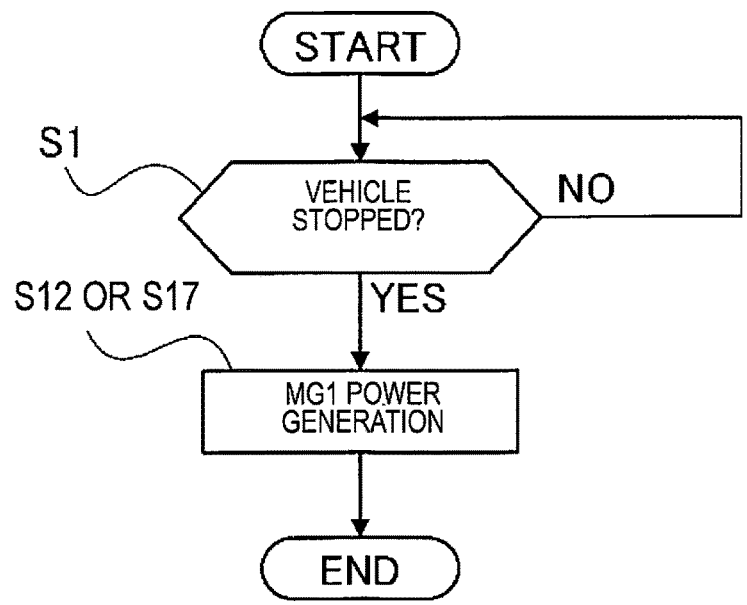
FIG. 14 is a flowchart illustrating a first characteristic configuration of a flow of the power generation control process that is executed in the hybrid control module of the first embodiment.

In contrast, the first embodiment is configured such that the hybrid control module 21 (power generation controller) disconnects the first motor/generator MG1, which has a greater electrical power generation capability than the second motor/generator MG2, from the drive wheels 19 and connects same to the internal combustion engine ICE when the vehicle is stopped, and carries out MG1 idle power generation, in which power is generated by the first motor/generator MG1 by receiving torque from the internal combustion engine ICE (FIG. 14). Each of the steps in FIG. 14 are given the same step numbers as in FIG. 5, and the description thereof is omitted. Hereinafter, the same applies to FIGS. 15-19. That is, since MG1 idle power generation, in which power is generated by the first motor/generator MG1, is carried out while the vehicle is stopped, more generated electrical power can be obtained compared with MG2 idle power generation, in which power is generated by the second motor/generator MG2, when the stopping time is the same, thereby preventing a reduction in the battery SOC. Therefore, it is possible to secure the electrical power required for starting while the vehicle is stopped.

Figure 15:
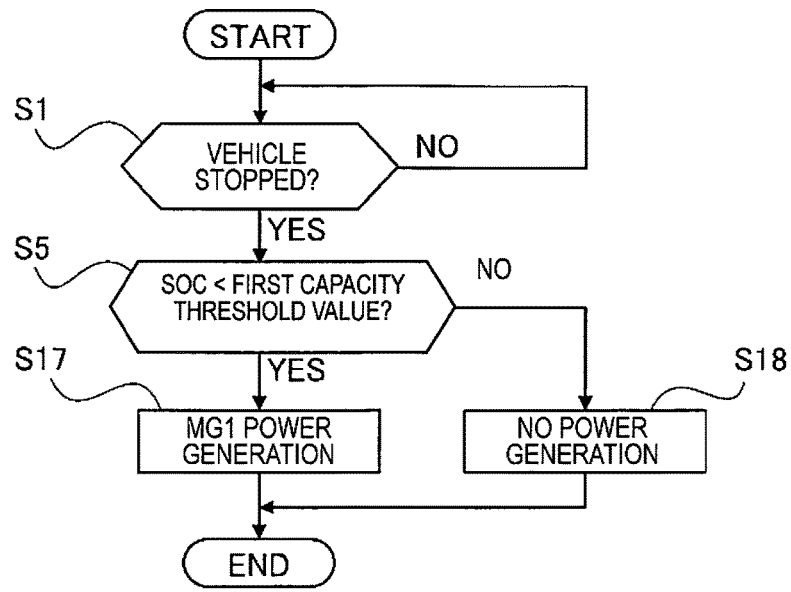
FIG. 15 is a flowchart illustrating a second characteristic configuration of a flow of the power generation control process that is executed in the hybrid control module of the first embodiment.

The first embodiment is configured such that MG1 idle power generation is carried out by the hybrid control module 21 at the time of insufficient battery SOC (battery capacity), in which the battery SOC is below the first capacity threshold value, while the vehicle is stopped (FIG. 15). In addition, the first embodiment is configured such that at the time of sufficient battery SOC (battery capacity), in which the battery SOC is equal to or greater than the first capacity threshold value, while the vehicle is stopped, MG1 idle power generation is not carried out and the first motor/generator MG1 is kept mechanically coupled to the drive wheels 19 (FIG. 15). That is, since, at the time of sufficient battery SOC, MG1 idle power generation is not carried out, and the first motor/generator MG1 is kept mechanically coupled to the drive wheels 19, it is possible to be prepared for a starting request. Therefore, at the time of sufficient battery SOC while the vehicle is stopped, the vehicle can be promptly started in response to a starting request. In addition, since MG1 idle power generation is carried out at the time of insufficient battery SOC, a reduction of the battery SOC is prevented. Therefore, it is possible to secure the electrical power required for starting, at the time of insufficient battery SOC while the vehicle is stopped.

Figure 16:
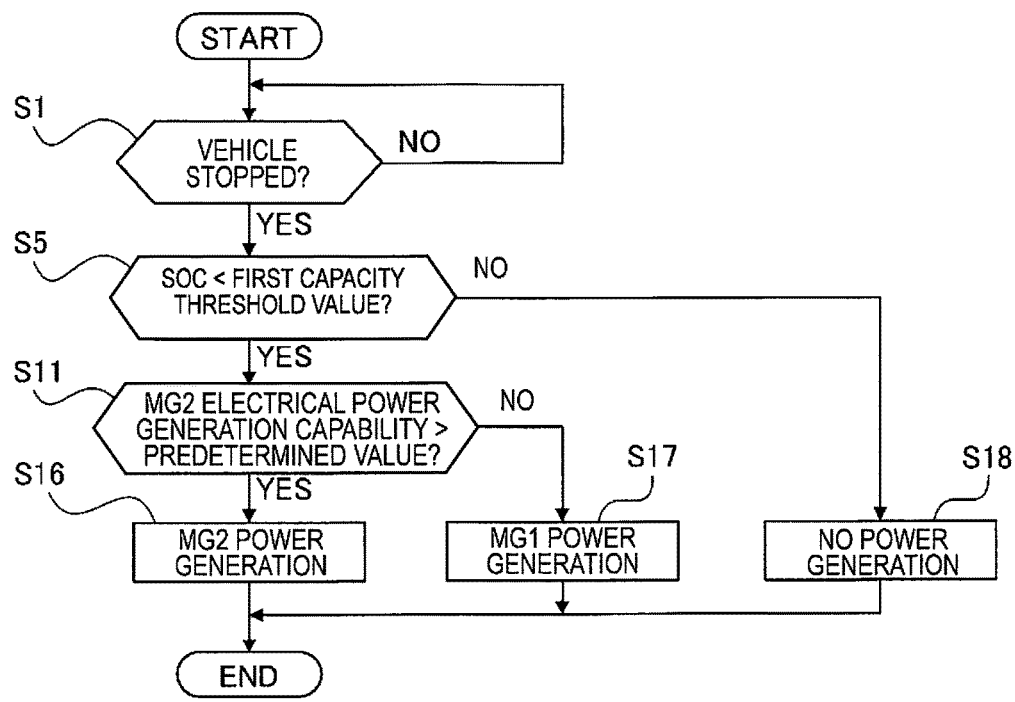
FIG. 16 is a flowchart illustrating a third characteristic configuration of a flow of the power generation control process that is executed in the hybrid control module of the first embodiment.

The first embodiment is configured such that, at the time of insufficient battery SOC while the vehicle is stopped, if the electrical power generation capability of the second motor/generator MG2 is greater than a predetermined value, MG2 idle power generation, in which power is generated by the second motor/generator MG2, is carried out, while MG1 idle power generation is not carried out, and the first motor/generator MG1 is kept mechanically coupled to the drive wheels 19, by the hybrid control module 21 (FIG. 16). Additionally, the first embodiment is configured such that, at the time of insufficient battery SOC while the vehicle is stopped, if the electrical power generation capability of the second motor/generator MG2 is equal to or less than the predetermined value, MG1 idle power generation is carried out (FIG. 16). That is, since MG2 idle power generation is carried out if the electrical power generation capability of the second motor/generator MG2 is greater than the predetermined value, a reduction of the battery SOC is prevented. In addition, at this time, since MG1 idle power generation is not carried out and the first motor/generator MG1 is kept mechanically coupled to the drive wheels 19, it is possible to be prepared for a starting request. Therefore, at the time of insufficient battery SOC while the vehicle is stopped, if the electrical power generation capability of the second motor/generator MG2 is greater than the predetermined value, it is possible to secure the electrical power required for starting, and the vehicle can be promptly started in response to a starting request. Additionally, since MG2 idle power generation is limited if the electrical power generation capability of the second motor/generator MG2 is equal to or less than the predetermined value, the second motor/generator MG2 is not used for power generation. However, since MG1 idle power generation is carried out, a reduction of the battery SOC is prevented. Therefore, at the time of insufficient battery SOC while the vehicle is stopped, if the electrical power generation capability of the second motor/generator MG2 is equal to or less than the predetermined value, it is possible to secure the electrical power required for starting. That is, since MG1 idle power generation or MG2 idle power generation is carried out at the time of insufficient battery SOC, a reduction of the battery SOC is prevented. Therefore, it is possible to secure the electrical power required for starting at the time of insufficient battery SOC while the vehicle is stopped. Moreover, since the second motor/generator MG2 is not used for power generation if the electrical power generation capability of the second motor/generator MG2 is equal to or less than the predetermined value, it is possible to prevent damage to the second motor/generator MG2.

Figure 17:
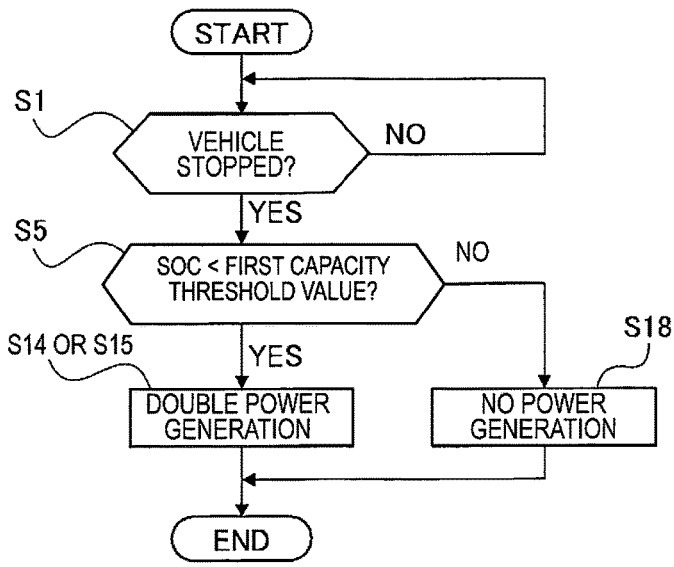
FIG. 17 is a flowchart illustrating a fourth characteristic configuration of a flow of the power generation control process that is executed in the hybrid control module of the first embodiment.

The first embodiment is configured such that, at the time of insufficient battery SOC while the vehicle is stopped, double idle power generation is carried out, in which MG2 idle power generation is carried out in addition to MG1 idle power generation, by the hybrid control module 21 (FIG. 17). Additionally, the first embodiment is configured such that at the time of sufficient battery SOC while the vehicle is stopped, MG1 idle power generation is not carried out, and the first motor/generator MG1 is kept mechanically coupled to the drive wheels 19 (FIG. 17). That is, since double idle power generation, in which MG2 idle power generation is carried out in addition to MG1 idle power generation, is carried out at the time of insufficient battery SOC, more generated electrical power can be obtained in a shorter amount of time, compared with a case in which power is generated by MG1 idle power generation or MG2 idle power generation, when the stopping time is the same, thereby preventing a reduction in the battery SOC. Therefore, at the time of insufficient battery SOC while the vehicle is stopped, it is possible to secure the electrical power required for starting in a short period of time, compared with a case in which power is generated by MG1 idle power generation or MG2 idle power generation. In addition, since, at the time of sufficient battery SOC, MG1 idle power generation is not carried out, and the first motor/generator MG1 is kept mechanically coupled to the drive wheels 19, it is possible to be prepared for a starting request. Therefore, at the time of sufficient battery SOC while the vehicle is stopped, the vehicle can be promptly started in response to a starting request.

Figure 18:
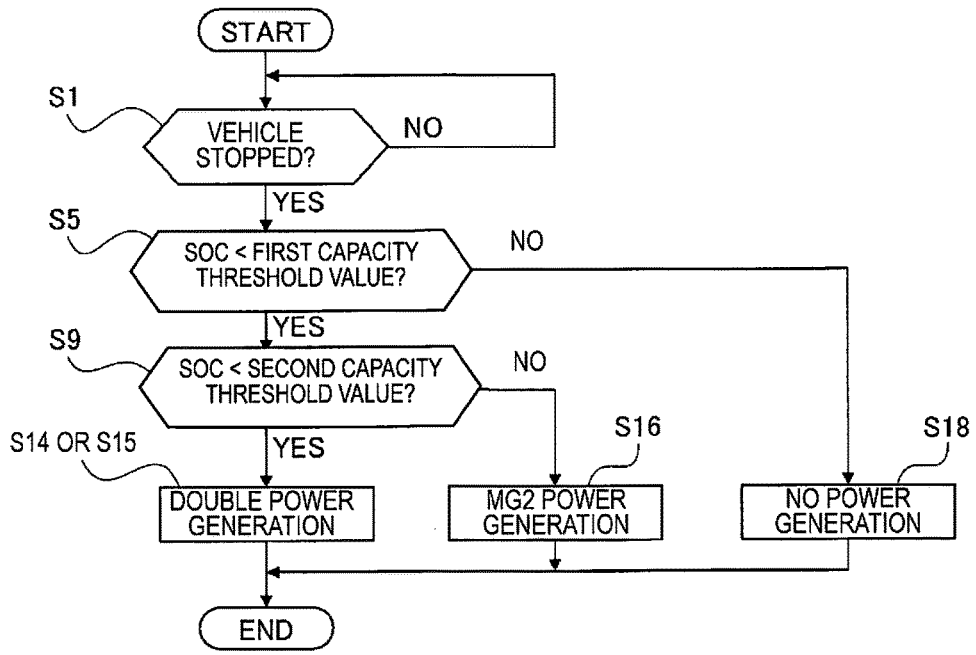
FIG. 18 is a flowchart illustrating a fifth characteristic configuration of a flow of the power generation control process that is executed in the hybrid control module of the first embodiment.

The first embodiment is configured such that, at the time of insufficient battery SOC while the vehicle is stopped, if the battery SOC equal to or greater than the second capacity threshold value, which is below the first capacity threshold value, MG2 idle power generation is carried out, while MG1 idle power generation is not carried out and the first motor/generator MG1 is kept mechanically coupled to the drive wheels 19, by the hybrid control module 21 (FIG. 18). In addition, the first embodiment is configured such that, at the time of insufficient battery SOC while the vehicle is stopped, if the battery SOC is below the second capacity threshold value, double idle power generation is carried out (FIG. 18). That is, when the battery SOC is equal to or greater than the second capacity threshold value and below the first capacity threshold value (at the time of "second capacity threshold value≤battery SOC<first capacity threshold value"), MG1 idle power generation is not carried out, and the first motor/generator MG1 is kept mechanically coupled to the drive wheels 19; therefore, it is possible to be prepared for a starting request. Additionally, when the battery SOC is below the second capacity threshold value (at the time of "battery SOC<second capacity threshold value"), double idle power generation is carried out; therefore, more generated electrical power can be obtained in a shorter amount of time, compared with a case in which power is generated by MG1 idle power generation or MG2 idle power generation, when the stopping time is the same, thereby preventing a reduction in the battery SOC. Therefore, at the time of insufficient battery SOC while the vehicle is stopped, the vehicle can be promptly started in response to a starting request if the battery SOC is equal to or greater than the second capacity threshold value, and it is possible to secure the electrical power required for starting in a short period of time, compared with a case in which power is generated by MG1 idle power generation or MG2 idle power generation, if the battery SOC is below the second capacity threshold value.

Figure 19:
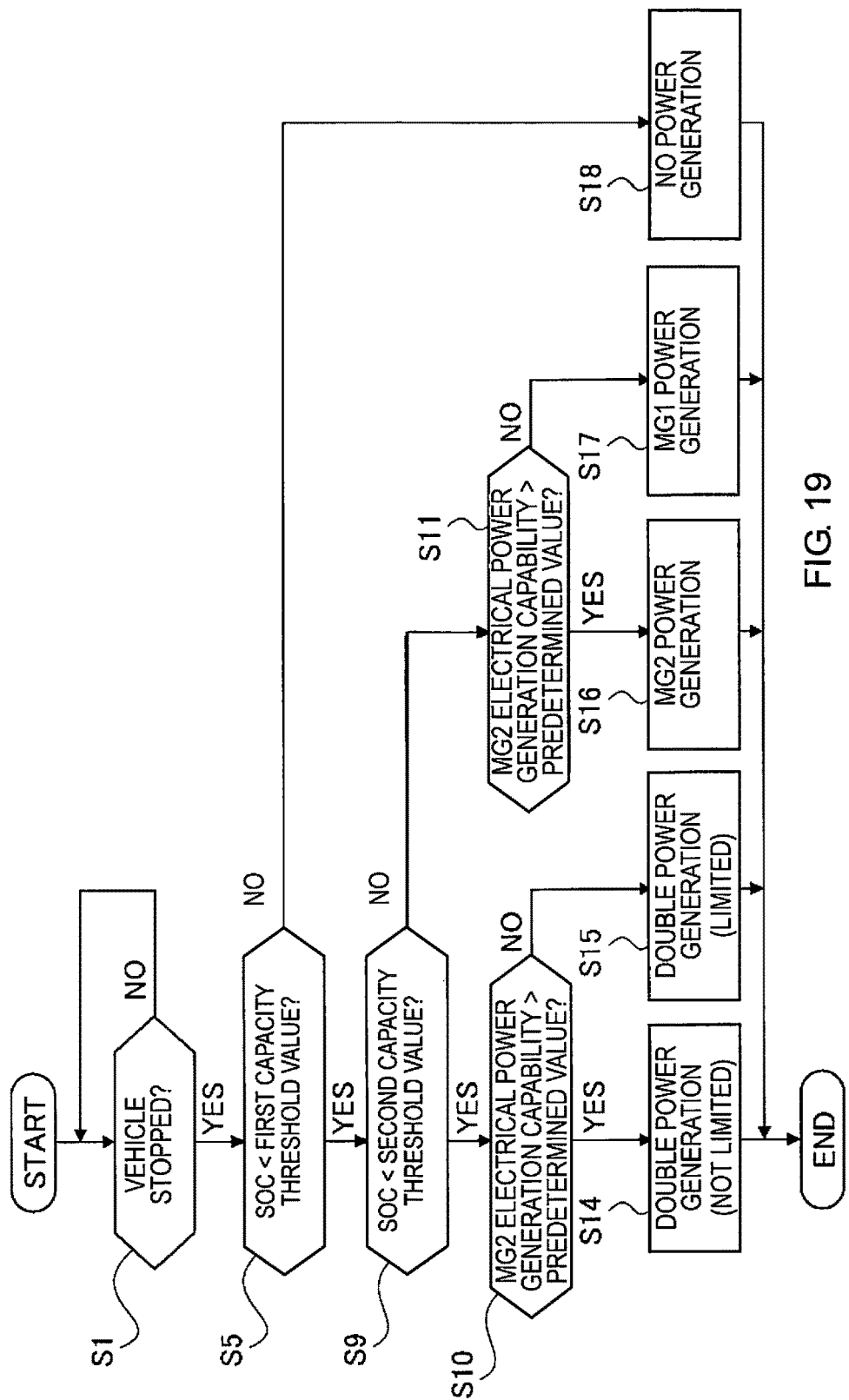
FIG. 19 is a flowchart illustrating a sixth characteristic configuration of a flow of the power generation control process that is executed in the hybrid control module of the first embodiment.

The first embodiment is configured such that, at the time of insufficient battery SOC while the vehicle is stopped, if the battery SOC is equal to or greater than the second capacity threshold value and the electrical power generation capability of the second motor/generator MG2 is greater than a predetermined value, MG2 idle power generation is carried out, while MG1 idle power generation is not carried out and the first motor/generator MG1 is kept mechanically coupled to the drive wheels 19, by the hybrid control module 21 (FIG. 19). Additionally, the first embodiment is configured such that, at the time of insufficient battery SOC while the vehicle is stopped, if the battery SOC is equal to or greater than the second capacity threshold value and the electrical power generation capability of the second motor/generator MG2 is equal to or less than the predetermined value, MG1 idle power generation is carried out (FIG. 19). That is, if the electrical power generation capability of the second motor/generator MG2 is greater than the predetermined value, MG1 idle power generation is not carried out, and the first motor/generator MG1 is kept mechanically coupled to the drive wheels 19; therefore, it is possible to be prepared for a starting request. Additionally, since MG2 idle power generation is limited if the electrical power generation capability of the second motor/generator MG2 is equal to or less than the predetermined value, the second motor/generator MG2 is not used for power generation. Therefore, at the time of insufficient battery SOC while the vehicle is stopped, the vehicle can be promptly started in response to a starting request if the battery SOC is equal to or greater than the second capacity threshold value and the electrical power generation capability of the second motor/generator MG2 is greater than the predetermined value, and it is possible to prevent damage to the second motor/generator MG2, if the battery SOC is equal to or greater than the second capacity threshold value and the electrical power generation capability of the second motor/generator MG2 is equal to or less than the predetermined value. In addition, since MG2 idle power generation is carried out if the electrical power generation capability of the second motor/generator MG2 is greater than the predetermined value, a reduction of the battery SOC is prevented. Therefore, at the time of insufficient battery SOC while the vehicle is stopped, if the battery SOC is equal to or greater than the second capacity threshold value and the electrical power generation capability of the second motor/generator MG2 is greater than the predetermined value, it is possible to secure the electrical power required for starting. Additionally, since MG2 idle power generation is limited but MG1 idle power generation is carried out if the electrical power generation capability of the second motor/generator MG2 is equal to or less than the predetermined value, a reduction of the battery SOC is prevented. Therefore, at the time of insufficient battery SOC while the vehicle is stopped, if the battery SOC is equal to or greater than the second capacity threshold value and the electrical power generation capability of the second motor/generator MG2 is equal to or greater than the predetermined value, it is possible to secure the electrical power required for starting. That is, since MG1 idle power generation or MG2 idle power generation is carried out when the battery SOC satisfies "second capacity threshold value≤battery SOC<first capacity threshold value," a reduction of the battery SOC is prevented. Therefore, at the time of insufficient battery SOC while the vehicle is stopped, if the battery SOC is equal to or greater than the second capacity threshold value, it is possible to secure the electrical power required for starting.

The first embodiment is configured such that, at the time of insufficient battery SOC while the vehicle is stopped, if the battery SOC is below the second capacity threshold value and the electrical power generation capability of the second motor/generator MG2 is greater than the predetermined value, double idle power generation is carried out (FIG. 19). Additionally, the first embodiment is configured such that, at the time of insufficient battery SOC while the vehicle is stopped, if the battery SOC is below the second capacity threshold value and the electrical power generation capability of the second motor/generator MG2 is equal to or less than the predetermined value, double idle limited power generation is carried out, in which MG2 idle limited power generation, wherein power generation is limited compared with MG2 idle power generation, is carried out in addition to MG1 idle power generation (FIG. 19). That is, MG2 idle power generation is limited if the electrical power generation capability of the second motor/generator MG2 is equal to or less than the predetermined value. However, since double idle limited power generation, in which MG2 idle limited power generation is carried out in addition to MG1 idle power generation, is carried out, more generated electrical power can be obtained in a shorter amount of time, compared with a case in which power is generated by MG1 idle power generation or MG2 idle power generation, when the stopping time is the same, thereby preventing a reduction in the battery SOC. Therefore, at the time of insufficient battery SOC while the vehicle is stopped, if the battery SOC is below the second capacity threshold value and the electrical power generation capability of the second motor/generator MG2 is equal to or less than the predetermined value, it is possible to secure the electrical power required for starting in a short period of time, compared with a case in which power is generated by MG1 idle power generation or MG2 idle power generation. Additionally, MG2 idle power generation is not limited if the electrical power generation capability of the second motor/generator MG2 is greater than the predetermined value. Accordingly, since double idle power generation is carried out, more generated electrical power can be obtained in a shorter amount of time, compared with a case in which power is generated by double idle limited power generation, when the stopping time is the same, thereby preventing a reduction in the battery SOC. Therefore, at the time of insufficient battery SOC while the vehicle is stopped, if the battery SOC is below the second capacity threshold value and the electrical power generation capability of the second motor/generator MG2 is greater than the predetermined value, it is possible to secure the electrical power required for starting in a short period of time, compared with a case in which power is generated by double idle limited power generation.

The first embodiment is configured such that, when power generation is carried out based on a power generation request from the driver while the vehicle is stopped, if the requested generated electrical power from the driver is greater than a predetermined value, MG1 idle power generation is carried out (Step S12 in FIG. 5). In addition, the first embodiment is configured such that, when power generation is carried out based on a power generation request from the driver while the vehicle is stopped, if the requested generated electrical power from the driver is equal to or less than the predetermined value, MG2 idle power generation is carried out while MG1 idle power generation is not carried out and the first motor/generator MG1 is kept mechanically coupled to the drive wheels 19 (Step S13 in FIG. 5). That is, since MG1 idle power generation is carried out if the requested generated electrical power from the driver is greater than the predetermined value, MG1 idle power generation corresponding to the requested generated electrical power from the driver is carried out. Additionally, if the requested generated electrical power from the driver is equal to or less than the predetermined value, MG1 idle power generation is not carried out, and the first motor/generator MG1 is kept mechanically coupled to the drive wheels 19; therefore, it is possible to be prepared for a starting request. Therefore, when power generation is carried out based on a power generation request from the driver while the vehicle is stopped, it is possible to respond to the requested generated electrical power from the driver if the requested generated electrical power from the driver is greater than the predetermined value, and the vehicle can be promptly started in response to a starting request if the requested generated electrical power from the driver is equal to or less than the predetermined value. Additionally, since MG2 idle power generation is carried out if the requested generated electrical power from the driver is equal to or less than the predetermined value, reduction of the battery SOC is prevented. Therefore, when power generation is carried out based on a power generation request from the driver while the vehicle is stopped, it is possible to secure the electrical power required for starting if the requested generated electrical power from the driver is equal to or less than the predetermined value.

In the first embodiment, MG1 idle power generation is prohibited by the hybrid control module 21 if a road surface gradient is detected (Step S6→Step S13 in FIG. 5). For example, when restarting a vehicle from a power generation state in a state in which the driving motor is disconnected from the drive wheels while the vehicle is stopped, the torque of the driving motor is not transmitted to the drive wheels during the period from when the driver takes his or her foot off of the brake pedal until the driving motor is connected to the drive wheels; therefore, the vehicle will roll down a sloped road. In contrast, in the first embodiment, MG1 idle power generation is prohibited if a road surface gradient is detected; therefore, the first motor/generator MG1 is kept mechanically coupled to the drive wheels 19. Accordingly, when restarting a vehicle from a power generation state while the vehicle is stopped, the torque of the first motor/generator MG1 is transmitted to the drive wheels 19, even if the driver's foot is off of the brake pedal. Therefore, when restarting a vehicle from a power generation state while the vehicle is stopped, it is possible to prevent the vehicle from rolling down a sloped road when a road surface gradient is detected. In addition, since MG2 idle power generation is carried out even if MG1 idle power generation is prohibited, a reduction of the battery SOC is prevented. Therefore, it is possible to secure the electrical power required for starting, even if a road surface gradient is detected while the vehicle is stopped.

In the first embodiment, if a braking force is generated on the drive wheels 19, MG1 idle power generation is permitted by the hybrid control module 21 ("YES" in Step S7 of FIG. 5). For example, if a malfunction of the clutch that connects the driving motor to the drive wheel occurs and the driving motor is connected to the drive wheel during power generation by the driving motor, the vehicle will suddenly start. In contrast, in the first embodiment, since MG1 idle power generation is permitted when a braking force is generated on the drive wheels 19, the vehicle will not suddenly start even if the third engagement clutch C3, which connects the first motor/generator MG1 and the drive wheels 19, malfunctions. Therefore, it is possible to prevent the vehicle from starting suddenly during MG1 idle power generation, when a braking force is generated.

In the first embodiment, if the P range is selected, MG1 idle power generation is permitted by the hybrid control module 21 ("YES" in Step S8 of FIG. 5). For example, if a malfunction of the clutch that connects the driving motor to the drive wheels occurs and the driving motor is connected to the drive wheel during power generation by the driving motor, the vehicle will suddenly start. In contrast, in the first embodiment, since MG1 idle power generation is permitted when the P range is selected, the vehicle will not suddenly start even if the third engagement clutch C3, which connects the first motor/generator MG1 and the drive wheels 19, malfunctions. Therefore, it is possible to prevent the vehicle from suddenly starting during MG1 idle power generation, when the P range is selected.

Next, the effects are described. The effects listed below can be obtained by the power generation control device for a hybrid vehicle according to the first embodiment.

(1) In a hybrid vehicle comprising a first electric motor (first motor/generator MG1) that is mechanically coupled to a drive wheels 19 and that is mainly used for powering travel, a second electric motor (second motor/generator MG2) that is mechanically coupled to an internal combustion engine ICE, and that has a smaller electrical power generation capability than the first electric motor (first motor/generator MG1), and a battery (high-power battery 3) that is electrically coupled to the first electric motor (first motor/generator MG1) and the second electric motor (second motor/generator MG2), and when starting the vehicle, an EV start is carried out using the first electric motor (first motor/generator MG1), to which electrical power generated in the second electric motor (second motor/generator MG2) and battery power are supplied, as a drive source, a power generation controller (hybrid control module 21) is provided, which causes at least one of the first electric motor (first motor/generator MG1) and the second electric motor (second motor/generator MG2) to generate power using torque of the internal combustion engine ICE, and when the vehicle is stopped, the power generation controller (hybrid control module 21) disconnects the first electric motor (first motor/generator MG1), which has a greater electrical power generation capability than the second electric motor (second motor/generator MG2), from the drive wheel 19 and connects same to the internal combustion engine ICE, and carries out MG1 idle power generation, in which power is generated by the first electric motor (first motor/generator MG1) by receiving the torque (ICE torque) from the internal combustion engine ICE (FIG. 14). Accordingly, it is possible to secure the electrical power required for starting, while the vehicle is stopped.

(2) While the vehicle is stopped, the power generation controller (hybrid control module 21) carries out MG1 idle power generation at the time of insufficient battery capacity (battery SOC), in which the charge capacity of the battery (battery SOC) is less than a first capacity threshold value, and does not carry out MG1 idle power generation and keeps the first electric motor (first motor/generator MG1) mechanically coupled to the drive wheel 19, at the time of sufficient battery capacity (battery SOC) in which the charge capacity of the battery (battery SOC) is equal to or greater than the first capacity threshold value (FIG. 15). Thus, in addition to the effect of (1), the vehicle can be promptly started in response to a starting request at the time of sufficient battery capacity (battery SOC) while the vehicle is stopped.

(3) At the time of insufficient battery capacity (battery SOC) while the vehicle is stopped, the power generation controller (hybrid control module 21) carries out MG2 idle power generation, in which power is generated by the second electric motor (second motor/generator MG2), while not carrying out MG1 idle power generation and keeping the first motor/generator MG1 mechanically coupled to the drive wheel 19, if the electrical power generation capability of the second electric motor (second motor/generator MG2) is greater than a predetermined value, and carries out MG1 idle power generation if the electrical power generation capability of the second electric motor (second motor/generator MG2) is equal to or less than the predetermined value (FIG. 16). Thus, in addition to the effect of (2), if the electrical power generation capability of the second motor/ generator MG2 is greater than the predetermined value at the time of insufficient battery capacity (battery SOC) while the vehicle is stopped, it is possible to secure the electrical power required for starting, and the vehicle can be promptly started in response to a starting request.

(4) While the vehicle is stopped, the power generation controller (hybrid control module 21) carries out double idle power generation, in which MG2 idle power generation, wherein power is generated by the second electric motor (second motor/generator MG2), is carried out in addition to MG1 idle power generation at the time of insufficient battery capacity (battery SOC), in which the charge capacity of the battery (battery SOC) is below the first capacity threshold value, and does not carry out MG1 idle power generation and keeps the first electric motor (first motor/generator MG1) mechanically coupled to the drive wheel 19, at the time of sufficient battery capacity (battery SOC) in which the charge capacity of the battery (battery SOC) is equal to or greater than the first capacity threshold value (FIG. 17). Thus, in addition to the effect of (1), it is possible to secure the electrical power required for starting in a short period of time, compared with a case in which power is generated by MG1 idle power generation or MG2 idle power generation, at the time of insufficient battery capacity (battery SOC) while the vehicle is stopped.

(5) At the time of insufficient battery capacity (battery SOC) while the vehicle is stopped, the power generation controller (hybrid control module 21) carries out MG2 idle power generation, while not carrying out MG1 idle power generation and keeping the first electric motor (first motor/generator MG1) mechanically coupled to the drive wheel 19 if the charge capacity of the battery (battery SOC) is equal to or greater than a second capacity threshold value, which is smaller than the first capacity threshold value, and carries out double idle power generation if the charge capacity of the battery (battery SOC) is less than the second capacity threshold value (FIG. 18). Thus, in addition to the effect of (4), at the time of insufficient battery capacity (battery SOC) while the vehicle is stopped, the vehicle can be promptly started in response to a starting request if the charge capacity of the battery (battery SOC) is equal to or greater than the second capacity threshold value, and it is possible to secure the electrical power required for starting in a short period of time, compared with a case in which power is generated by MG1 idle power generation or MG2 idle power generation, if the charge capacity of the battery (battery SOC) is less than the second capacity threshold value.

(6) At the time of insufficient battery capacity (battery SOC) while the vehicle is stopped, the power generation controller (hybrid control module 21) carries out MG2 idle power generation, while not carrying out MG1 idle power generation and keeping the first electric motor (first motor/generator MG1) mechanically coupled to the drive wheel 19 if the charge capacity of the battery (battery SOC) is equal to or greater than the second capacity threshold value and the electrical power generation capability of the second electric motor (second motor/generator MG2) is greater than a predetermined value, and carries out MG1 idle power generation if the charge capacity of the battery (battery SOC) is equal to or greater than the second capacity threshold value and the electrical power generation capability of the second electric motor (second motor/generator MG2) is equal to or less than the predetermined value (FIG. 19). Thus, in addition to the effect of (5), at the time of insufficient battery capacity (battery SOC) while the vehicle is stopped, the vehicle can be promptly started in response to a starting request if the charge capacity of the battery (battery SOC) is equal to or greater than the second capacity threshold value and the electrical power generation capability of the second motor/generator MG2 is greater than the predetermined value, and it is possible to prevent damage to the second motor/generator MG2, if the charge capacity of the battery (battery SOC) is equal to or greater than the second capacity threshold value and the electrical power generation capability of the second motor/generator MG2 is equal to or less than the predetermined value.

(7) At the time of insufficient battery capacity (battery SOC) while the vehicle is stopped, the power generation controller (hybrid control module 21) carries out double idle power generation if the charge capacity of the battery (battery SOC) is less than the second capacity threshold value and the electrical power generation capability of the second electric motor (second motor/generator MG2) is greater than the predetermined value, and carries out double idle limited power generation, in which MG2 idle limited power generation, wherein power generation is limited compared to MG2 idle power generation, is carried out in addition to MG1 idle power generation, if the charge capacity of the battery (battery SOC) is less than the second capacity threshold value and the electrical power generation capability of the second electric motor (second motor/generator MG2) is equal to or less than the predetermined value (FIG. 19). Thus, in addition to the effect of (5) or (6), at the time of insufficient battery capacity (battery SOC) while the vehicle is stopped, if the charge capacity of the battery (battery SOC) is less than the second capacity threshold value and the electrical power generation capability of the second motor/generator MG2 is equal to or less than the predetermined value, it is possible to secure the electrical power required for starting in a short period of time, compared with a case in which power is generated by MG1 idle power generation or MG2 idle power generation.

(8) When power generation is carried out based on a power generation request from the driver while the vehicle is stopped, the power generation controller (hybrid control module 21) carries out MG1 idle power generation if the requested generated electrical power from the driver is greater than a predetermined value, and carries out MG2 idle power generation, wherein power is generated by the second electric motor (second motor/generator MG2), while not carrying out MG1 idle power generation and keeping the first electric motor (first motor/generator MG1) mechanically coupled to the drive wheel 19, if the requested generated electrical power from the driver is equal to or less than the predetermined value (Step S12 and Step S13 in FIG. 5). Thus, in addition to the effects of (1)-(7), when power generation is carried out based on a power generation request from the driver while the vehicle is stopped, it is possible to respond to the requested generated electrical power from the driver if the requested generated electrical power from the driver is greater than the predetermined value, and the vehicle can be promptly started in response to a starting request if the requested generated electrical power from the driver is equal to or less than the predetermined value.

(9) The power generation controller (hybrid control module 21) prohibits MG1 idle power generation if a road surface gradient is detected (Step S6→Step S13 in FIG. 5). Thus, in addition to the effects of (1)-(8), when restarting a vehicle from a power generation state while the vehicle is stopped, it is possible to prevent the vehicle from rolling down a sloped road when a road surface gradient is detected.

(10) The power generation controller (hybrid control module 21) permits MG1 idle power generation, if a braking force is generated on the drive wheel 19 ("YES" in Step S7 of FIG. 5). Thus, in addition to the effects of (1)-(9), it is possible to prevent the vehicle from starting suddenly during MG1 idle power generation, when a braking force is generated.

(11) The power generation controller (hybrid control module 21) permits MG1 idle power generation, if a parking range is selected ("YES" in Step S8 of FIG. 5). Thus, in addition to the effects of (1)-(10), it is possible to prevent the vehicle from starting suddenly during MG1 idle power generation, when the P range is selected.

The power generation control device for a hybrid vehicle of the present invention was described above based on the first embodiment, but specific configurations thereof are not limited to the first embodiment, and various modifications and additions to the design can be made without departing from the scope of the invention according to each claim in the Claims.

In the first embodiment, an example was shown in which MG2 idle power generation is carried out while MG1 idle power generation is not carried out and the first motor/generator MG1 is kept mechanically coupled to the drive wheel 19: However, it is not necessary to keep the first motor/generator MG1 mechanically coupled t the drive wheel 19. That is, when MG1 idle power generation is not carried out and MG2 idle power generation is carried out (at the time of MG2 idle power generation control process), the gear shift stage may be switched from "EV 1st ICE-" to "Neutral." Accordingly, in Step S16, MG2 idle power generation may be carried out after switching to the "Neutral" gear shift stage. In addition, in the case that the gear shift stage is switched to "Neutral" in Step S16, a switchover of the engagement clutches C1, C3 is carried out in preparation for a restart (EV start) after ending MG2 idle power generation, and the gear shift stage is switched from "Neutral" to "EV 1st ICE-."

In the first embodiment, an example of a transmission controller was shown in which those gear shift stages, which exclude the interlock gear shift stages and the gear shift stages that cannot be selected by the shift mechanism from all the gear shift stages that can be obtained by engagement combinations of a plurality of engagement clutches C1, C2, C3, are considered the plurality of gear shift stages that can be obtained by the multistage gear transmission 1. However, the transmission controller may be configured such that those gear shift stages, which exclude the interlock gear shift stages from all the gear shift stages that can be obtained by engagement combinations of a plurality of engagement clutches, are considered the plurality of gear shift stages that can be obtained by the transmission. For example, if the shift mechanism is configured as a mechanism that causes each of the engagement clutches C1, C2, C3 to carry out a stroke operation independently, there will be no "gear shift stages that cannot be selected by the shift mechanism." In this case, there will be more gear shift stages that are used as gear shift stages during malfunction.

In the first embodiment, an example was shown in which traveling is carried out in the "parallel HEV mode," or the like, in which the engine driving force of the internal combustion engine ICE is assisted by the motor driving force. However, the internal combustion engine ICE may be used only for power generation. That is, the power generation control device for a hybrid vehicle of the present invention may be applied to a series hybrid vehicle as well.

The invention claimed is:

1. A power generation control device for a hybrid vehicle having a first electric motor that is mechanically coupled to a drive wheel and that is mainly used as a drive source for travel driving, a second electric motor that is mechanically coupled to an internal combustion engine, and that has a smaller electrical power generation capability than the first electric motor, and a battery that is electrically coupled to the first electric motor and the second electric motor, and when starting the vehicle, an EV start is carried out using the first electric motor as a drive source to which electrical power generated in the second electric motor and battery power are supplied, in a starting region in which the vehicle speed is equal to or less than a predetermined vehicle speed, and the power generation control device comprising:

a power generation controller configured to cause at least one of the first electric motor and the second electric motor to generate power using torque of the internal combustion engine, and while the vehicle is stopped at a time of insufficient battery capacity in which a charge capacity of the battery is less than a first capacity threshold value corresponding to an electrical power that is required for the EV start, the power generation controller is configured to disconnect the first electric motor from the drive wheel, connect the first electric motor to the internal combustion engine, and carry out MG1 idle power generation in which power is generated by the first electric motor by receiving torque from the internal combustion engine, and while the vehicle is stopped at a time of sufficient battery capacity in which the charge capacity of the battery is equal to or greater than the first capacity threshold value, the power generation controller is configured not to carry out the MG1 idle power generation and to keep the first electric motor mechanically coupled to the drive wheel.

2. The power generation control device as recited in claim 1, wherein at the time of insufficient battery capacity while the vehicle is stopped, the power generation controller carries out MG2 idle power generation, in which power is generated by the second electric motor while not carrying out the MG1 idle power generation and keeping the first electric motor mechanically coupled to the drive wheel, instead of the MG1 idle power generation, if an electrical power generation capability of the second electric motor is greater than a predetermined value, and carries out the MG1 idle power generation if the electrical power generation capability of the second electric motor is equal to or less than the predetermined value.

3. The power generation control device as recited in claim 2, wherein when power generation is carried out based on a power generation request from a driver while the vehicle is stopped, the power generation controller carries out MG1 idle power generation if the requested generated electrical power from the driver is greater than a predetermined value, and carries out MG2 idle power generation, where power is generated by the second electric motor while not carrying out the MG1 idle power generation and keeping the first electric motor mechanically coupled to the drive wheel instead of the MG1 idle power generation, if the requested generated electrical power from the driver is equal to or less than the predetermined value.

4. The power generation control device as recited in claim 2, wherein
the power generation controller prohibits the MG1 idle power generation if a road surface gradient is detected.

5. The power generation control device as recited in claim 2, wherein
the power generation controller permits the MG1 idle power generation if a braking force is generated on the drive wheel.

6. The power generation control device as recited in claim 2, wherein
the power generation controller permits the MG1 idle power generation if a parking range is selected.

7. The power generation control device as recited in claim 1, wherein
while the vehicle is stopped, the power generation controller carries out double idle power generation, in which MG2 idle power generation, where power is generated by the second electric motor, is carried out in addition to the MG1 idle power generation at the time of the insufficient battery capacity, in which a charge capacity of the battery is less than a first capacity threshold value, and does not carry out the MG1 idle power generation and keeps the first electric motor mechanically coupled to the drive wheel, at the time of sufficient battery capacity, in which the charge capacity of the battery is equal to or greater than the first capacity threshold value.

8. The power generation control device as recited in claim 7, wherein
at the time of the insufficient battery capacity while the vehicle is stopped, the power generation controller carries out the MG2 idle power generation instead of the double idle power generation, while not carrying out the MG1 idle power generation and keeping the first electric motor mechanically coupled to the drive wheel if the charge capacity of the battery is equal to or greater than a second capacity threshold value, which is smaller than the first capacity threshold value, and carries out the double idle power generation if the charge capacity of the battery is less than the second capacity threshold value.

9. The power generation control device as recited in claim 8, wherein
at the time of the insufficient battery capacity while the vehicle is stopped, the power generation controller carries out the MG2 idle power generation instead of the double idle power generation, while not carrying out the MG1 idle power generation and keeping the first electric motor mechanically coupled to the drive wheel if the charge capacity of the battery is equal to or greater than the second capacity threshold value and the electrical power generation capability of the second electric motor is greater than a predetermined value, and carries out the MG1 idle power generation if the charge capacity of the battery is equal to or greater than the second capacity threshold value and the electrical power generation capability of the second electric motor is equal to or less than the predetermined value.

10. The power generation control device as recited in claim 9, wherein
at the time of the insufficient battery capacity while the vehicle is stopped, the power generation controller carries out the double idle power generation if the charge capacity of the battery is less than the second capacity threshold value and the electrical power generation capability of the second electric motor is greater than a predetermined value, and
carries out double idle limited power generation, in which MG2 idle limited power generation, where power generation is limited compared to the MG2 idle power generation, is carried out in addition to the MG1 idle power generation, if the charge capacity of the battery is less than the second capacity threshold value and the electrical power generation capability of the second electric motor is equal to or less than the predetermined value.

11. The power generation control device as recited in claim 8, wherein
at the time of the insufficient battery capacity while the vehicle is stopped, the power generation controller carries out the double idle power generation if the charge capacity of the battery is less than the second capacity threshold value and the electrical power generation capability of the second electric motor is greater than a predetermined value, and
carries out double idle limited power generation, in which MG2 idle limited power generation, where power generation is limited compared to the MG2 idle power generation, is carried out in addition to the MG1 idle power generation, if the charge capacity of the battery is less than the second capacity threshold value and the electrical power generation capability of the second electric motor is equal to or less than the predetermined value.

12. The power generation control device as recited in claim 7, wherein
when power generation is carried out based on a power generation request from a driver while the vehicle is stopped, the power generation controller carries out MG1 idle power generation if the requested generated electrical power from the driver is greater than a predetermined value, and carries out MG2 idle power generation, where power is generated by the second electric motor while not carrying out the MG1 idle power generation and keeping the first electric motor mechanically coupled to the drive wheel instead of the MG1 idle power generation, if the requested generated electrical power from the driver is equal to or less than the predetermined value.

13. The power generation control device as recited in claim 7, wherein
the power generation controller prohibits the MG1 idle power generation if a road surface gradient is detected.

14. The power generation control device as recited in claim 7, wherein
the power generation controller permits the MG1 idle power generation if a braking force is generated on the drive wheel.

15. The power generation control device as recited in claim 7, wherein
the power generation controller permits the MG1 idle power generation if a parking range is selected.

16. The power generation control device as recited in claim 1, wherein
when power generation is carried out based on a power generation request from a driver while the vehicle is stopped, the power generation controller carries out MG1 idle power generation if the requested generated electrical power from the driver is greater than a predetermined value, and carries out MG2 idle power generation, where power is generated by the second electric motor while not carrying out the MG1 idle power generation and keeping the first electric motor mechanically coupled to the drive wheel instead of the MG1 idle power generation, if the requested generated electrical power from the driver is equal to or less than the predetermined value.

17. The power generation control device as recited in claim 1, wherein
the power generation controller prohibits the MG1 idle power generation if a road surface gradient is detected.

18. The power generation control device as recited in claim 1, wherein
the power generation controller permits the MG1 idle power generation if a braking force is generated on the drive wheel.

19. The power generation control device as recited in claim 1, wherein
the power generation controller permits the MG1 idle power generation if a parking range is selected.

* * * * *